United States Patent
Ohno et al.

(10) Patent No.: US 6,628,893 B2
(45) Date of Patent: Sep. 30, 2003

(54) DC MOTOR ROTATION CONTROL APPARATUS

(75) Inventors: Yoshimi Ohno, Kawasaki (JP); Ikuya Tsurukawa, Yokohama (JP); Kenji Koyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/753,552

(22) Filed: Jan. 4, 2001

(65) Prior Publication Data

US 2001/0019660 A1 Sep. 6, 2001

(30) Foreign Application Priority Data

Jan. 6, 2000 (JP) ........................ 2000-001159

(51) Int. Cl.$^7$ ................................................ H02P 5/00
(52) U.S. Cl. ..................... 388/800; 318/138; 318/245; 318/254; 318/432; 318/434; 318/439; 318/685; 318/800; 318/801; 318/802
(58) Field of Search ............................... 318/138, 245, 318/254, 439, 801, 802, 803, 809, 685, 800, 432, 434

(56) References Cited

U.S. PATENT DOCUMENTS

| | | | | |
|---|---|---|---|---|
| 5,552,689 A | * | 9/1996 | Matoba | 318/599 |
| 5,600,218 A | * | 2/1997 | Hollings et al. | 318/439 |
| 5,751,128 A | * | 5/1998 | Chalupa et al. | 318/439 |
| 5,783,924 A | * | 7/1998 | Kahlman | 318/601 |
| 5,821,713 A | * | 10/1998 | Hollings et al. | 318/439 |
| 5,834,911 A | * | 11/1998 | Kimura | 318/254 |
| 5,898,288 A | * | 4/1999 | Rice et al. | 318/685 |
| 5,923,134 A | * | 7/1999 | Takekawa | 318/254 |
| 6,020,715 A | * | 2/2000 | Yasohara et al. | 318/808 |
| 6,049,187 A | * | 4/2000 | Haner | 318/725 |

FOREIGN PATENT DOCUMENTS

| | | | | |
|---|---|---|---|---|
| JP | 4-127864 | * | 4/1992 | H02K/23/66 |
| JP | 4-190658 | * | 7/1992 | H02K/11/00 |
| JP | 6-189504 | * | 7/1994 | H02K/11/00 |
| JP | 6-245454 | * | 9/1994 | H02K/23/66 |
| JP | 6-245571 | * | 9/1994 | H02P/5/06 |
| JP | 5-347613 | * | 7/1995 | H02P/5/17 |
| JP | 9-222433 | * | 8/1997 | H02K/23/00 |

* cited by examiner

Primary Examiner—Robert E. Nappi
Assistant Examiner—Tyrone Smith
(74) Attorney, Agent, or Firm—Oblon, Spivak, McClelland, Maier & Neustadt, P.C.

(57) ABSTRACT

A direct current motor rotation control apparatus, a method and device for controlling a rotational speed of a direct current motor, and an apparatus having the direct current motor rotation control apparatus. The apparatus and device control rotational operations of a direct current motor such that the direct current motor rotation control apparatus includes at least one rotation detecting brush which detects a signal indicative of an operation of the direct current motor, a motor driving circuit which drives the direct current motor by applying the direct current drive voltage to the pair of electrode brushes, a reference voltage generating device which generates a reference voltage a comparator which compares a voltage detected by the rotation detecting brush with the reference voltage generated by the reference voltage generating device and produces an output comparison voltage, and a motor control circuit which adjusts the direct current drive voltage based on the output comparison voltage. The direct current motor includes including a stator, a rotor with a rotation shaft and rotor coils, a commutator connected to the rotor coils, and a pair of electrode brushes in sliding contact with the commutator. The at least one rotation detecting brush contacts the commutator at a different axial position from an axial position contacted by the pair of electrode brushes. The comparator can compare a voltage detected by the rotation detecting brush with the reference voltage generated by the reference voltage generating device and produces as a comparison voltage output pulses of voltage. As such, the motor control circuit can determine an instantaneous rotational speed and adjust the drive voltage to the pair of electrode brushes accordingly.

34 Claims, 27 Drawing Sheets

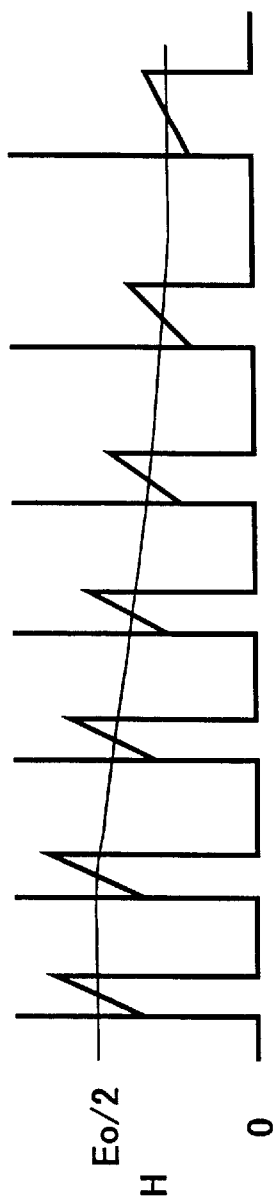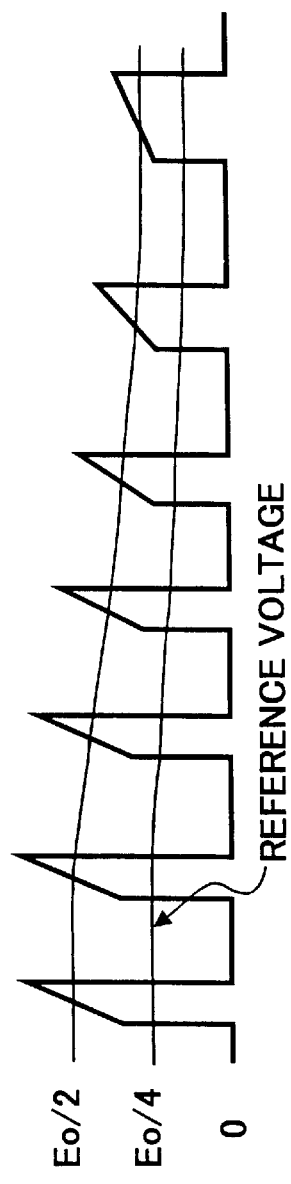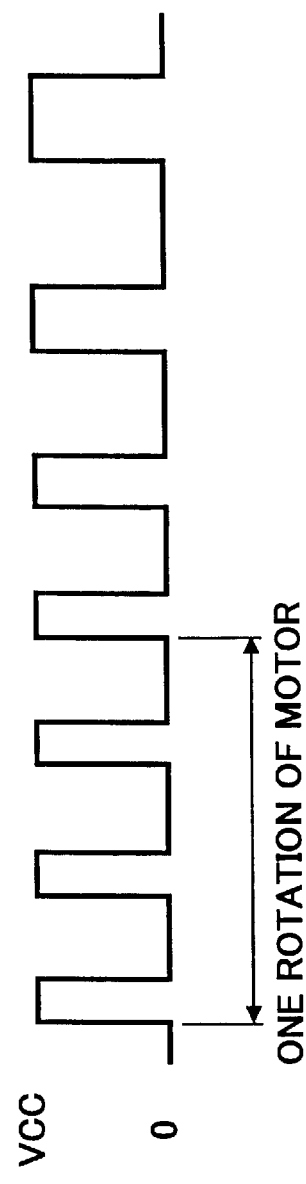
FIG. 7A ROTATION DETECTING BRUSH OUTPUT SIGNAL SA2
FIG. 7B NOISE REMOVING CIRCUIT OUTPUT SIGNAL SB2
FIG. 7C COMPARATOR OUTPUT SIGNAL SC2

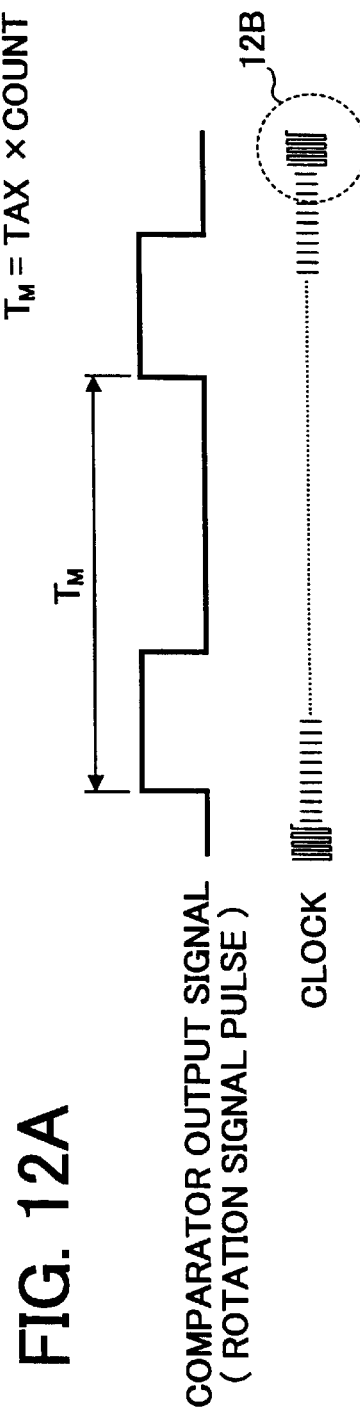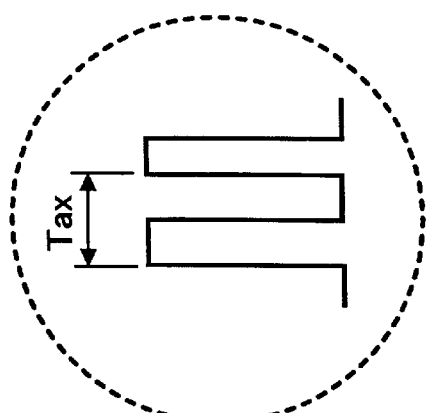
FIG. 12A
FIG. 12B

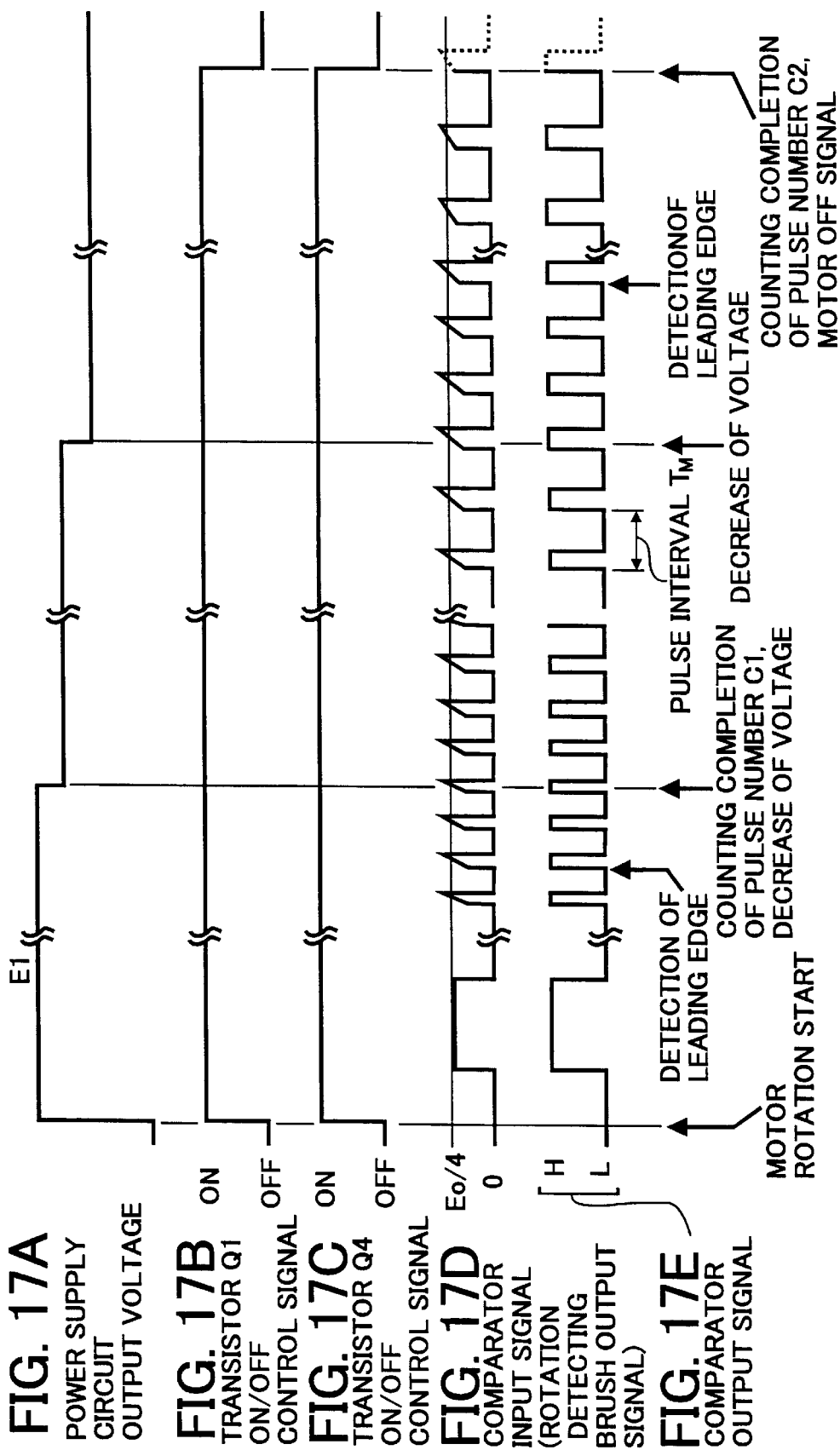

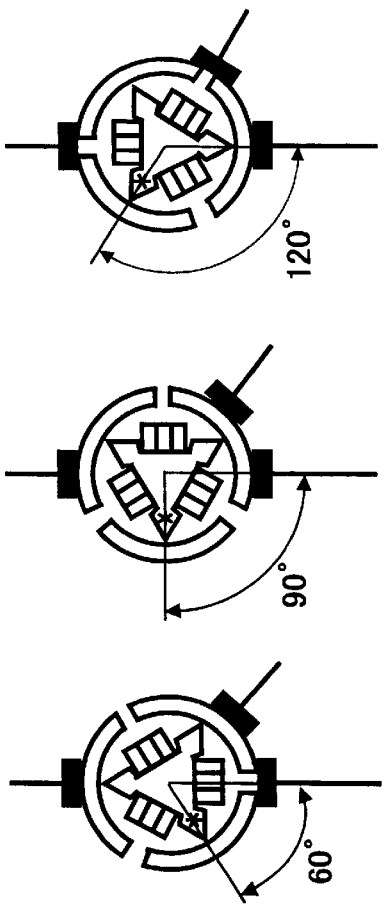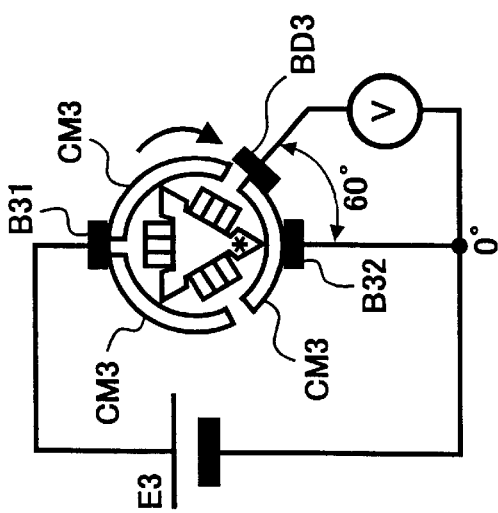

DC MOTOR ROTATION CONTROL APPARATUS

CROSS-REFERENCE TO RELATED APPLICATIONS

This application claims priority under 35 U.S.C. §119 and contains subject matter related to Japanese Patent Application No. 2000-001159 filed on Jan. 6, 2000, the entire contents of which are hereby incorporated by reference. This document is related to the U.S. application Ser. No. 09/737,767 entitled "DC MOTOR": filed on Dec. 18, 2000, the entire contents of which is also incorporated by reference here.

BACKGROUND OF THE INVENTION

1. Field of the Invention

The present invention relates to an apparatus wherein a DC (direct current) motor is used as a driving force for performing mechanical operations, and stabilization of the rotation speed of the DC motor and control of cumulative rotation number of the DC motor are required, more particularly relates to a DC motor rotation detecting apparatus and a DC motor rotation control apparatus wherein rotational operations of a rotor of the DC motor are controlled by detecting at least one of a rotational direction, a rotation speed, a cumulative rotation number, and a rotational position of the rotor.

2. Discussion of the Background

A brush-use DC motor is much used as a driving force for mechanical operations in a camera, such as, for example, zooming operations wherein photographic lenses including a zoom lens are zoomed, focusing operations wherein at least one of a photographic lens and an imaging device is moved along an optic axis of the photographic lens for focusing based on the information of distance from an object to an image focusing point, and film feeding operations wherein a photographic film is wound and rewound.

In the brush-use DC motor, plural fixed magnetic poles are formed in a stator employing a permanent magnet, etc. A DC drive current is switched corresponding to rotation angle of a rotor and is applied to plural rotor coils forming plural magnetic poles of the rotor through a commutator which rotates together with the rotor and through a brush which is in sliding contact with the commutator. Thereby, the rotor rotates.

There are, for example, five types of apparatuses using a motor as a driving force: (1) uni-directional rotations of the motor are used, and a rotation speed of the motor is required to be kept constant; (2) uni-directional rotations of the motor are used, and a cumulative rotation number of the motor, that is, a total driving amount of the motor, is required to be controlled; (3) bi-directional rotations of the motor (i.e., a forward rotation and a reverse rotation) are used, and a rotation speed only on uni-directional rotations of the motor is required to be kept constant; (4) bi-directional rotations of the motor are used, and each rotation speed on bi-directional rotations of the motor is required to be kept constant; and (5) bi-directional rotations of the motor are used, and a cumulative rotation number on unidirectional rotations of the motor is required to be controlled.

With regard to a rotation control method of a motor in an apparatus, there are, for example, two types of apparatuses according to their uses and operation environmental conditions; (1) a rotation speed of the motor is controlled by changing a drive voltage for driving the motor, and (2) a rotation speed of the motor is controlled by a chopping control wherein a drive voltage is intermittently applied to the motor.

As an example of the above-described brush-use DC motor, FIG. 22 illustrates a three-pole motor. In the three-pole motor, electricity is fed to a commutator CM0 which is in sliding contact with a pair of electrode brushes B01 and B02 from a DC drive power supply E0 through the paired electrode brushes B01 and B02. The paired electrode brushes B01 and B02 are brought into contact with the commutator CM0 on rotation angle positions different by 180°. The commutator CM0 includes three pieces which form a cylindrical surface and rotates together with a rotor of the DC motor. The three pieces of the commutator CM0 are separated at an equally angled interval of about 120°. Three rotor coils are connected to each other between the adjacent pieces of the commutator CM0, and thereby three rotor magnetic poles are formed therebetween. The polarity of these rotor magnetic poles varies depending on the contact state of each piece of the commutator CM0 and the electrode brushes B01 and B02 which changes corresponding to the rotation angle of the rotor. Thereby, a rotation driving force is generated between, for example, a pair of stator magnetic poles of a permanent magnet at the side of a stator (not shown).

With the rotation of the rotor, respective rotor magnetic poles oppose to respective stator magnetic poles in order, and the contact state of each piece of the commutator CM0 and the electrode brushes B01 and B02 changes. Thus, by the variance of the polarity of each rotor magnetic pole in order, the rotor continually rotates.

Specifically, when a voltage is applied to the paired electrode brushes B01 and B02 from the power supply E0, the current flows from one of the electrode brushes B01 and B02 to another through the rotor coils. The magnetic field is generated by the rotor coils, and thereby the rotor magnetic poles are formed. By the action of the magnetic field generated by the rotor coils and the magnetic field generated by the stator magnetic poles, the rotor rotates.

As a method of detecting the rotation of the above-described motor, a rotary encoder method is known. Specifically, in the rotary encoder method, a rotation slit disk having slits on the circumferential surface thereof is provided on a rotation output shaft of the motor or in a power transmission mechanism rotated by the rotation output shaft. The rotation of the motor is detected by the method of detecting the slits on the circumferential surface of the rotation slit disk with a photointerrupter. Although the rotary encoder method allows an accurate detection of the rotation of the motor, space and cost for the rotary encoder constructed by the rotation slit disk, the photointerrupter, etc. are inevitably increased.

Further, another method of detecting the rotation of the motor from the drive voltage ripple of the motor is described referring to FIGS. 23 and 24. In FIG. 23, a resistor R0 is connected in series to electrode brushes B01 and B02 in a power supplying line for supplying the motor drive current to the electrode brushes B01 and B02 from a drive power supply E0, and the voltage between both terminals of the resistor R0 is detected. In such the way, the ripple waveform of 60°-period of the drive current as illustrated in FIG. 24 is obtained.

Because the ripple waveform corresponds to the rotation angle position of a rotor, the pulse signal corresponding to the rotation angle position can be obtained by suitably rectifying (shaping) the ripple waveform. Although this another rotation detecting method is advantageous in cost and space, detection errors due to noise cause inaccuracies. Thus, this rotation detecting method is disadvantageous.

Japanese Laid-open patent publication No. 4-127864 describes another method for detecting a rotation speed of a DC motor wherein a rotation detecting brush is provided in addition to a pair of electrode brushes. The rotation detecting brush is brought into sliding contact with a commutator so as to extract a voltage applied to the commutator. The rotation speed of the DC motor is detected based on the signal generated by the rotation detecting brush.

Further, Japanese Laid-open patent publication No. 4-127864 describes a DC motor control circuit illustrated in FIG. 25. Referring to FIG. 25, a rotation detecting brush BD0 is provided to a motor M0 in addition to a pair of electrode brushes B01 and B02. The rotation detecting brush BD0 is connected to a differentiating circuit 101, a time constant reset circuit 102, and a time constant circuit 103 in order. In a comparator 105, the voltage of the output signal from the time constant circuit 103 is applied to a non-inversion input terminal (i.e., +side) of the comparator 105, and the voltage of the output signal from a reference voltage generating device 104 is applied to an inversion input terminal (i.e., −side) of the comparator 105. The output signal from the comparator 105 is connected to one terminal of exciting coils of a relay 107 through a diode 106. Another terminal of the exciting coils of the relay 107 is connected to one terminal of a drive power supply E0. The pair of electrode brushes B01 and B02 is connected to the drive power supply E0 via a contact 107a of the relay 107.

One terminal of the exciting coils of the relay 107 is connected to a collector of a transistor 109a of a motor starting circuit 109 via a diode 108. The motor starting signal is applied to a base of the transistor 109a via a resistor 109b. A resistor 109c is connected between the base and an emitter of the transistor 109a. The emitter of the transistor 109a is connected to another terminal of the drive power supply E0.

FIG. 26 is a diagram illustrating waveforms of a motor starting signal input to the motor starting circuit 109, a rotation detecting signal SA0 of the rotation detecting brush BD0, an output signal SB0 from the differentiating circuit 101, an output signal SC0 from the time constant circuit 103, an output signal SD0 from the comparator 105, an operation (on/off) signal of the relay 107, and a supply signal applied to a motor M0 from a drive power supply E0.

When the transistor 109a of the motor starting circuit 109 is turned on by the motor starting signal, the relay 107 is turned on and the contact 107a is closed. Thereby, the electric power is supplied to the motor M0 through the electrode brushes B01 and B02, and the motor M0 starts rotating.

With the rotation of the motor M0, pulse train SA0 is output from the rotation detecting brush BD0 and is differentiated in the differentiating circuit 101. Then, signal SB0 which synchronized in the leading edge of each pulse is applied to the time constant reset circuit 102. The time constant reset circuit 102 is synchronized in the signal SB0, and resets the time constant circuit 103. Then, signal SC0 is output from the time constant circuit 103 as illustrated in FIG. 26.

In the normal state in which the motor M0 rotates at a usual rotation speed, the voltage of the output signal SC0 from the time constant circuit 103 does not exceed the reference voltage applied from the reference voltage generating device 104. In this state, output signal SD0 from the comparator 105 is in an "L" (low) level, and the relay 107 is excited and keeps ON condition. Thereby, the supply of electricity to the motor M0 is maintained.

However, when the rotation speed of the motor M0 lowers by overloads, etc., the voltage of the output signal SC0 from the time constant circuit 103 exceeds the reference voltage. Thereby, the output signal SD0 from the comparator 105 becomes a "H" (high) level, and the exciting current does not flow through the relay 107. Thereby, the relay 107 is turned off, and the contact 107a is opened. As a result, the supply of electricity to the motor M0 is stopped.

Thus, in the above-described DC motor control circuit, the lowering of the rotation speed of the motor M0 is detected, and excessive current is prevented from flowing in the motor M0 by stopping the DC motor M0.

Japanese Laid-open patent publication No. 4-127864 describes a DC motor control circuit wherein only when the rotation speed of the motor M0 is lower than the certain rotation speed is the relay 107 turned off.

DC motor control circuits which detect and control the rotation speed, the rotational position, the cumulative rotation number, and the rotational direction of the DC motor with high accuracy are heretofore not known in the art.

SUMMARY OF THE INVENTION

The present invention has been made in view of the above-discussed and other problems, and an object of the present invention is to address these and other problems.

Accordingly, an object of the present invention is to provide a novel DC motor rotation detecting apparatus and a DC motor rotation control apparatus that can detect and control at least one of a rotation speed, a cumulative rotation number, a rotational position, and a rotational direction of a DC motor with accuracy.

These and other objects are achieved according to the present invention in a novel direct current motor rotation control apparatus, a method and device for controlling a rotational speed of a direct current motor, and an apparatus having the direct current motor rotation control apparatus. The apparatus and device control rotational operations of a direct current motor such that the direct current motor rotation control apparatus includes at least one rotation detecting brush which detects a signal indicative of an operation of the direct current motor, a motor driving circuit which drives the direct current motor by applying the direct current drive voltage to the pair of electrode brushes, a reference voltage generating device which generates a reference voltage, a comparator which compares a voltage detected by the rotation detecting brush with the reference voltage generated by the reference voltage generating device and produces an output comparison voltage, and a motor control circuit which adjusts the direct current drive voltage based on the output comparison voltage. The direct current motor includes a stator, a rotor with a rotation shaft and rotor coils, a commutator connected to the rotor coils, and a pair of electrode brushes in sliding contact with the commutator. The at least one rotation detecting brush contacts the commutator at a different axial position from an axial position contacted by the pair of electrode brushes. The comparator can compare a voltage detected by the rotation detecting brush with the reference voltage generated by the reference voltage generating device and produces as a comparison voltage output pulses of voltage. As such, the motor control circuit can determine an instantaneous rotational speed and adjust the drive voltage to the pair of electrode brushes accordingly.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7A is a diagram illustrating waveform of an output signal from the rotation detecting brush, FIG. 7B is a diagram illustrating waveform of an output signal from the noise removing circuit, and FIG. 7C is a diagram illustrating waveform of an output signal from the comparator;

FIG. 12A is a waveform diagram for explaining a measurement of pulse interval, and FIG. 12B is an enlarged view of one period of clock;

FIG. 17A is a diagram illustrating a waveform of an output voltage of a power supply circuit, FIG. 17B is a diagram illustrating a waveform of an on/off control signal of a transistor Q1, FIG. 17C is a diagram illustrating a waveform of an on/off control signal of a transistor Q4, FIG. 17D is a diagram illustrating a waveform of a signal input to a non-inversion input terminal of a comparator, and FIG. 17E is a diagram illustrating a waveform of an output signal from the comparator;

FIGS. 18A through 18E are schematic views illustrating an example of a DC motor wherein a rotation detecting brush is arranged in a position inclined by 60° relatively to an electrode brush, and conditions of a commutator rotating clockwise in order by 30°;

DESCRIPTION OF THE PREFERRED EMBODIMENTS

Figure 1:
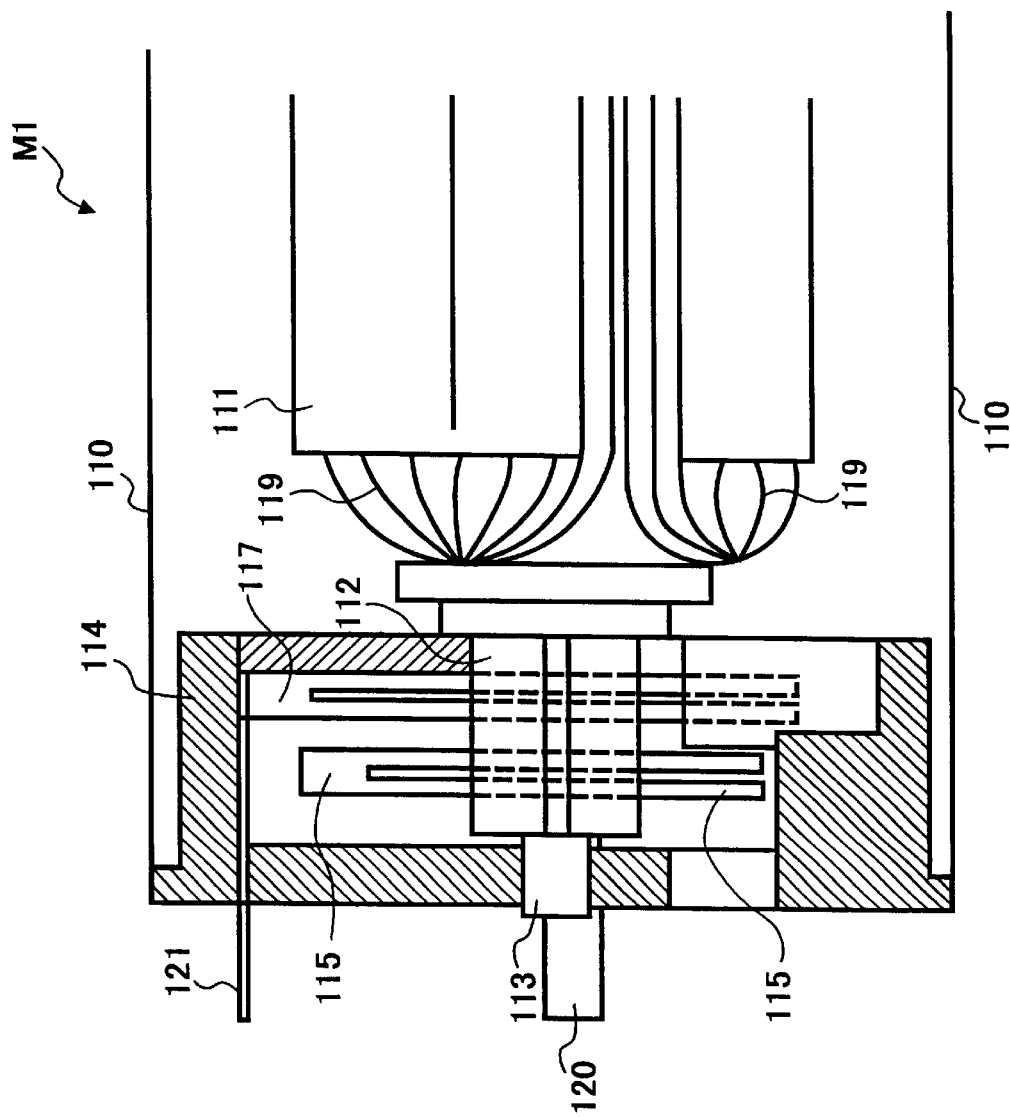
FIG. 1 is a schematic front view of a DC motor of the present invention illustrating a part of the DC motor shown in a longitudinal cross section.

Embodiments of the present invention are described in detail referring to the drawings, wherein like reference numerals designate identical or corresponding parts throughout the several views.

Figure 2:
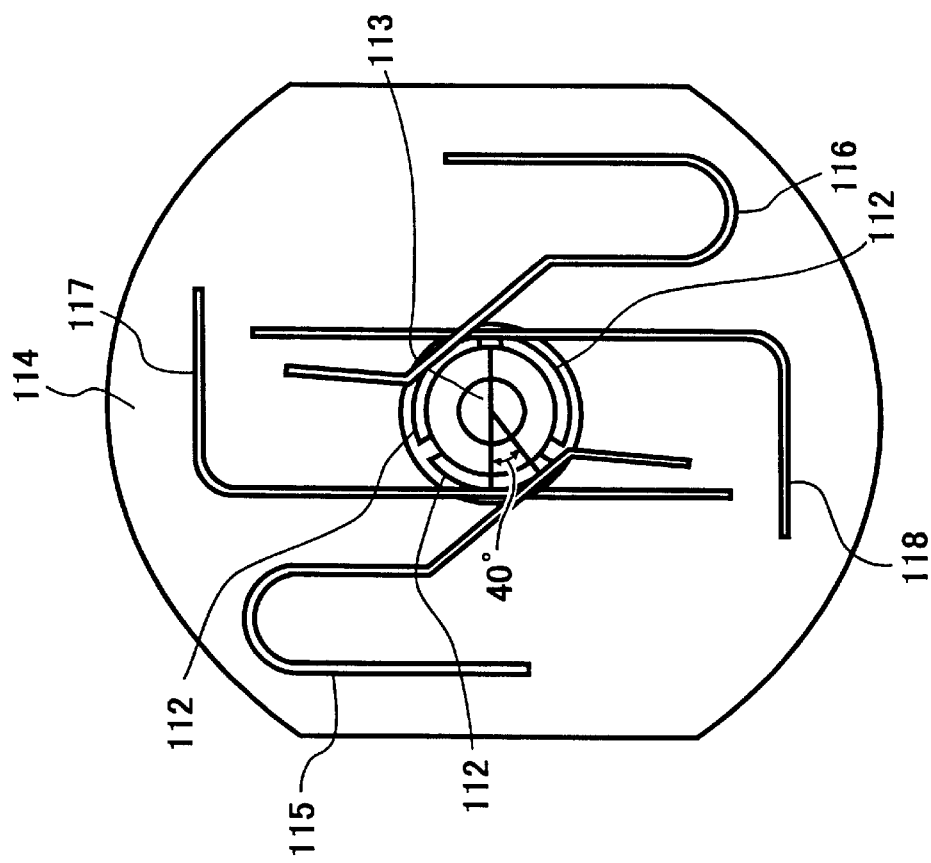
FIG. 2 is a schematic showing an internal cross-sectional view of the DC motor viewing from a left side opposed to a tip end of a rotation shaft of the DC motor.

FIGS. 1 and 2 illustrate a construction of a section in the vicinity of electrode brushes and rotation detecting brushes of a DC motor of the present invention. FIG. 1 is a schematic front view of the DC motor which illustrates a part of the DC motor shown in a longitudinal cross section, and FIG. 2 is a schematic of an internal cross-sectional view of the DC motor viewing from the left side opposed to a tip end of a rotation shaft. FIGS. 1 and 2 illustrate main elements of a DC motor M1 such as a stator 110, a rotor 111, a commutator 112, a rotation shaft 113, a support base 114, a pair of electrode brushes 115 and 116, a pair of rotation detecting brushes 117 and 118, and etc. (the stator 110 and the rotor 111 are not shown in FIG. 2). For sake of clarity, FIG. 1 depicts only the electrode brush 115 and the rotation detecting brush 117 which are arranged by shifting the position in the thrust direction along an axis of the rotation shaft 113. Referring to FIG. 2, the rotation detecting brushes 117 and 118 are arranged on the rotation angle position of 40 20 relative to the electrode brushes 115 and 116, respectively.

The rotor 111 forms, for example, three magnetic poles with the structure including three sets of rotor coils 119 wound in the rotor 111. The rotor 111 is fixed on the rotation shaft 113. The commutator 112 includes segments made up of, for example, three conductive pieces which surround the circumference of the rotation shaft 113 at equally angled intervals with somewhat small gap. Each set of rotor coils 119 of the rotor 111 is connected to each other between the segments of the commutator 112 adjacent to each other. The rotation shaft 113 fixedly supports the rotor 111 on the intermediate portion of the rotation shaft 113, and fixedly supports the commutator 112 on the portion of the rotation shaft 113 close to one end of the rotor 111. The rotation shaft 113 is rotatably held by the support base 114, etc.

The support base 114 rotatably holds the rotation shaft 113 at a position in the vicinity of one end of the rotation shaft 113 at the side of the commutator 112 by a suitable bearing mechanism. The support base 114 is in the shape of short-sized cylinder which is hollow and has one end surface portion, and accommodates and supports almost all portions of the paired electrode brushes 115 and 116 and the paired rotation detecting brushes 117 and 118 in its hollow portion. In the state that the support base 114 holds the rotation shaft 113, the support base 114 accommodates almost all portions of the commutator 112 in its hollow portion.

The stator 110 accommodates the rotor 111, the commutator 112, the rotation shaft 113, and etc. Further, the stator 110 partially accommodates the support base 114. In such the way, the assembly as mentioned above constitutes a unit of the DC motor M1.

The paired electrode brushes 115 and 116 are made of a material in a state of plate which is conductive and resilient. As illustrated in FIG. 2, the electrode brushes 115 and 116 are respectively bent in U shape. One end of each electrode brush 115 and 116 is bent outward. The one end thereof is further bent back such that the tip end portion thereof becomes almost parallel with the non-bent portion. At each other tip end portion of electrode brushes 115 and 116, an extending portion that extends in a direction perpendicular to the end surface portion of the support base 114 is formed.

The electrode brushes 115 and 116 are formed in a rotationally symmetric state relative to the rotation shaft 113 which is almost in parallel with the extending portions. The support base 114 holds the electrode brushes 115 and 116 in the hollow portion such that the electrode brushes 115 and 116 are brought into sliding contact with the commutator 112 on the rotation angle position of 180° relative to the commutator 112.

The paired rotation detecting brushes 117 and 118 are made of a material in a state of plate which is conductive and resilient. As illustrated in FIG. 2, the rotation detecting brushes 117 and 118 are respectively bent in L shape. One portion of each rotation detecting brush 117 and 118 from the bent point is longer than the other portion therefrom. At each tip end portion of the other portions of the rotation detecting brushes 117 and 118, an extending portion that extends in a direction perpendicular to the end surface portion of the support base 114 is formed.

The rotation detecting brushes 117 and 118 are formed in a rotationally symmetric state relative to the rotation shaft 113 which is almost in parallel with the extending portions. The support base 114 holds the rotation detecting brushes 117 and 118 in the hollow portion such that the rotation detecting brushes 117 and 118 are brought into sliding contact with the commutator 112 on the rotation angle position of 180° relative to the commutator 112. In addition, the sliding contact position of each rotation detecting brush 117 and 118 is a position different from the sliding contact position of each electrode brush 115 and 116 at a predetermined positional interval in the thrust direction along the axis of the rotation shaft 113. The sliding contact positions of the rotation detecting brushes 117 and 118 are shifted by a predetermined rotation angle, for example, 40° relative to the sliding contact positions of the electrode brushes 115 and 116, respectively.

The support base 114 includes a through-hole on the center of the end plate portion thereof so as to pass the rotation shaft 113 into the through-hole and to rotatably hold the rotation shaft 113. A bearing portion is formed at the through-hole.

Respective tip ends of the extending portions at the other tip end portions of the electrode brushes 115 and 116, and respective tip ends of the extending portions at the tip end portions of the rotation detection brushes 117 and 118 protrude outward from the end surface portion of the support base 114 to serve as external connection terminals 120 and 121, respectively.

Although the pair of rotation detecting brushes 117 and 118 is provided in the DC motor M1, only one of the rotation detecting brushes 117 and 118 can be provided therein.

Hereinafter described is a DC motor rotation control apparatus of the present invention that controls a rotation speed of a DC motor. However, before describing the DC motor rotation control apparatus of the present invention, a DC motor rotation detecting apparatus that is employed in the DC motor rotation control apparatus of the present invention is described.

Figure 3:
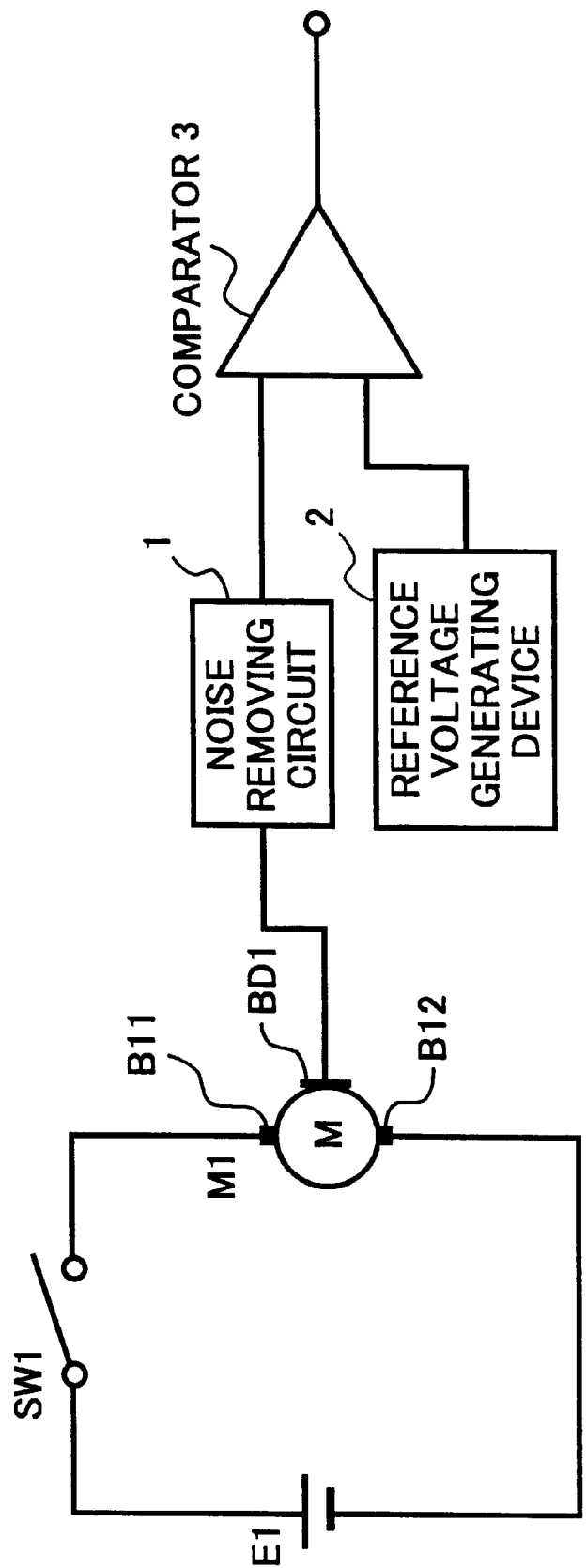
FIG. 3 is a circuit diagram illustrating a basic configuration of a DC motor rotation detecting apparatus.

FIG. 3 is a circuit diagram illustrating a basic configuration of a DC motor rotation detecting apparatus that detects a rotational operation of the above-described DC motor. The DC motor M1 is driven by applying a drive voltage Eo from a drive power supply E1 through a switch SW1. The DC motor M1 includes one rotation detecting brush BD1 in addition to a pair of electrode brushes B11 and B12.

The DC motor rotation detecting apparatus includes a noise removing circuit 1, a reference voltage generating device 2, and a comparator 3. The noise removing circuit 1 removes noise components such as the waveform in a state of a sharp surge from the signal detected by the rotation detecting brush BD1 and applies the detecting signal voltage to the comparator 3.

The reference voltage generating device 2 generates a reference voltage for converting the detection signal generated by the rotation detecting brush BD1 into pulse train of pulse period and pulse width corresponding to the rotation speed of the DC motor M1, and then applies the reference voltage to the comparator 3.

The comparator 3 compares the voltage of the detection signal generated by the rotation detection brush BD1 from which the noise is removed by the noise removing circuit 1 with the reference voltage generated by the reference voltage generating device 2, and outputs pulse train of pulse period and pulse width corresponding to the rotation speed of the DC motor M1.

Figure 4:
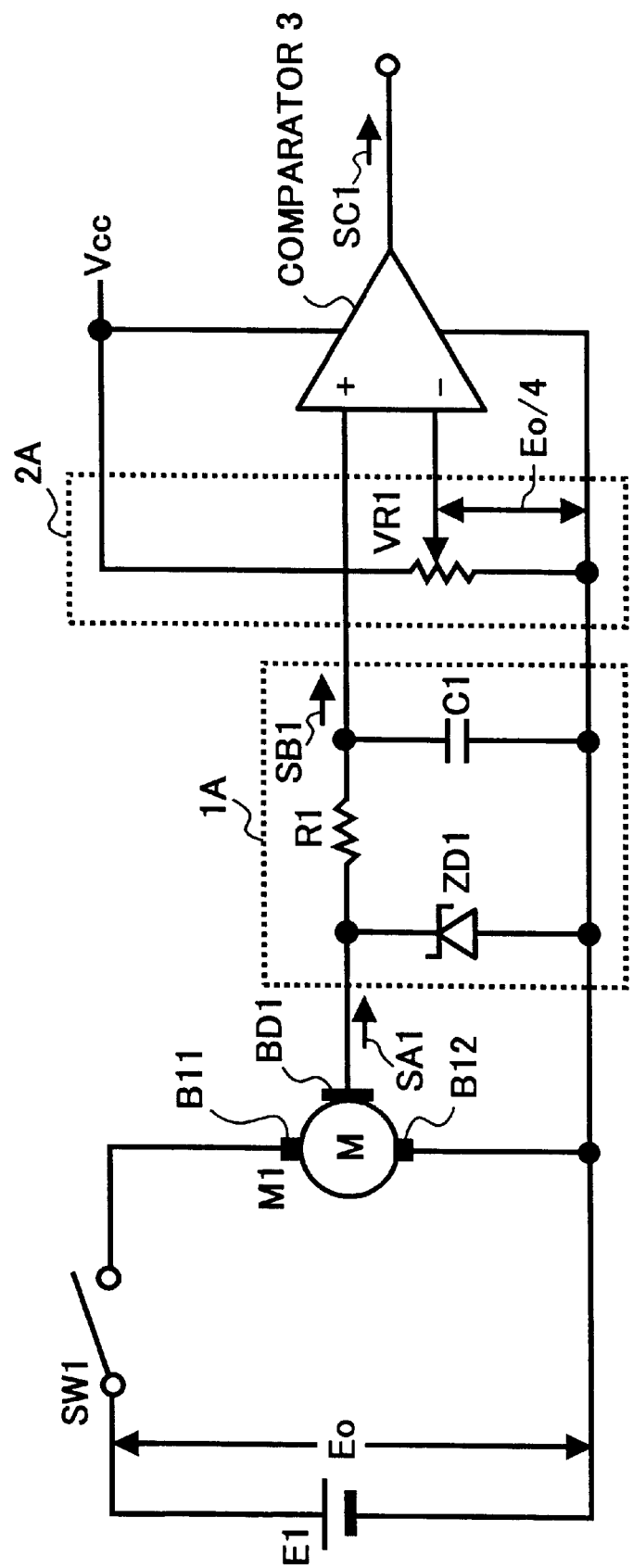
FIG. 4 is a circuit diagram illustrating an example of a DC motor rotation detecting apparatus.

FIG. 4 illustrates an example of a DC motor rotation detecting apparatus that detects a rotational operation of a DC motor. The DC motor rotation detecting apparatus of FIG. 4 has more specific configuration than the DC motor rotation detecting apparatus of FIG. 3. The DC motor rotation detecting apparatus of FIG. 4 includes a noise removing circuit 1A, a reference voltage generating device 2A, and the comparator 3.

The noise removing circuit 1A removes noise components such as the waveform in a state of a sharp surge from the signal detected by the rotation detecting brush BD1 and applies the detecting signal voltage to the comparator 3. The noise removing circuit 1A includes a constant-voltage diode ZD1, a resistor R1, and a capacitor C1.

The constant-voltage diode ZD1 (e.g., Zener diode, etc.) is connected across the rotation detecting brush BD1 and the common low-voltage side of the drive power supply E1. The common low-voltage side of the drive power supply E1 may be referred to as a ground level.

The resistor R1 and the capacitor C1 are connected in series. One side of the resistor R1 is connected to the rotation detecting brush BD1, and the capacitor C1 is connected to the common low-voltage side of the drive power supply E1. The series circuit of the resistor R1 and the capacitor C1 is connected in parallel with the constant-voltage diode ZD1 across the rotation detecting brush BD1 and the common low-voltage side of the drive power supply E1.

A voltage between both terminals of the capacitor C1, that is, a voltage between a connection point of the capacitor and the common low-voltage side of the drive power supply E1, is applied to a non-inversion input terminal (i.e., the positive side) of the comparator 3.

The reference voltage generating device 2A generates a reference voltage for converting the detection signal generated by the rotation detecting brush BD1 into pulse train of pulse period and pulse width corresponding to the rotation speed of the DC motor M1, and then applies the reference voltage to the comparator 3. The reference voltage generating device 2A includes a potentiometer VR1.

The both terminals at both fixed sides of the potentiometer VR1 are connected to a power supply voltage Vcc side and the common low-voltage side, respectively. A voltage between the movable terminal of the potentiometer VR1 and the common low-voltage side (e.g., a reference voltage almost equal to Eo/4) is applied to an inversion input terminal (i.e., the negative side) of the comparator 3.

In the comparator 3, the voltage of the detection signal generated by the rotation detecting brush BD1 from which the noise is removed by the noise removing circuit 1 is applied to the non-inversion input terminal (i.e., the positive side), and the reference voltage (Eo/4) generated by the reference voltage generating device 2 is applied to the inversion input terminal (i.e., the negative side). The comparator 3 compares the above-described voltage of the detection signal with the reference voltage (Eo/4).

When an output voltage from the noise removing circuit 1A exceeds the reference voltage (Eo/4), the comparator 3 outputs the power supply voltage Vcc (i.e., a high or a first level), and when the output voltage from the noise removing circuit 1A equals to the reference voltage (Eo/4) or smaller, the comparator 3 outputs the common low-voltage (i.e., a low or a second level). The comparator 3 outputs a pulse train with a pulse period and a pulse width corresponding to the rotation speed of the DC motor M1.

Figure 5:
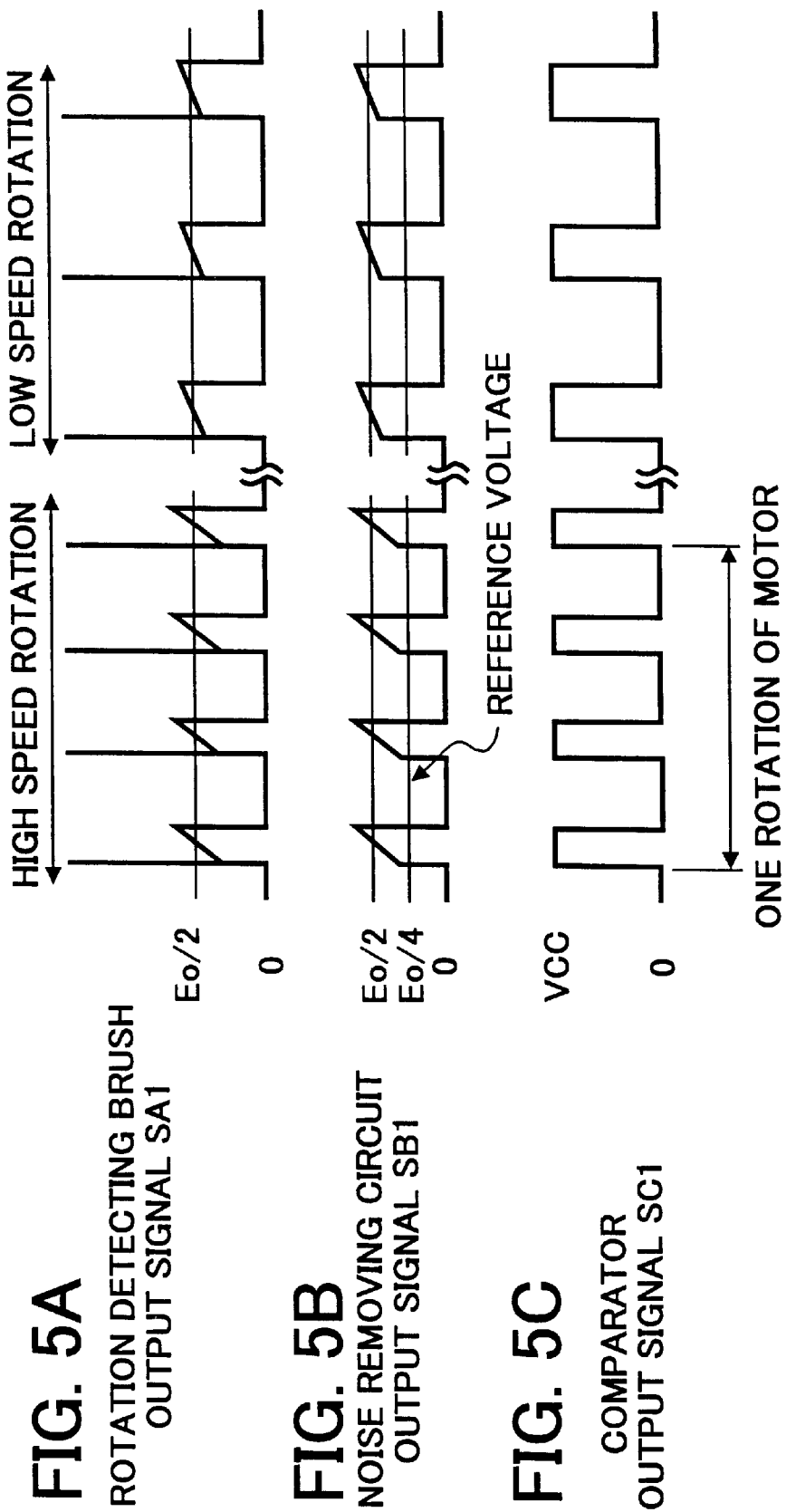
FIG. 5A is a diagram illustrating waveform of an output signal from a rotation detecting brush.
FIG. 5B is a diagram illustrating waveform of an output signal from a noise removing circuit.
FIG. 5C is a diagram illustrating waveform of an output signal from the comparator.

Next, an operation of the DC motor rotation detecting apparatus of FIG. 4 is described referring to FIGS. 5A through 5C. FIG. 5A is a diagram illustrating waveform of an output signal SA1 from the rotation detecting brush BD1 at the time of high and low speed rotations of the DC motor M1. FIG. 5B is a diagram illustrating waveform of an output signal SB1 from the noise removing circuit 1 at the time of high and low speed rotations of the DC motor M1. FIG. 5C is a diagram illustrating waveform of an output signal SC1 from the comparator 3 at the time of high and low speed rotations of the DC motor M1.

The DC motor M1 and the switch SW1 are connected in series to the drive power supply E1 with a drive voltage Eo. The rotation detecting brush BD1 of the DC motor M1 is connected to the noise removing circuit 1A. As described above, in the noise removing circuit 1A, the series circuit of the resistor R1 and the capacitor C1 is connected in parallel with the constant-voltage diode ZD1. The constant-voltage diode ZD1 clamps the voltage of the counter electromotive force induced by the action of self-induction of the rotor windings of the DC motor M1, i.e., the rotor coils.

The resistor R1 and the capacitor C1 construct a lowpass filter for taking out an output voltage from a connection point of the resistor R1 and the capacitor C1 and removing high frequency component. The output voltage taken out from the connection point of the resistor R1 and the capacitor C1 is applied to the non-inversion input terminal (i.e., the positive side) of the comparator 3.

When the switch SW1 is closed, the drive voltage Eo is applied to the DC motor M1 from the drive power supply E1. Thereby, the rotor coils are magnetically exited through the electrode brushes B11 and B12, and the rotor rotates relative to the permanent magnets in the. By the rotation of the DC motor M1, the voltage signal SA1, almost in the state of pulse, is generated onto the rotation detecting brush BD1.

Regarding the sharp surge-state waveform of the leading edge portion of each pulse in the pulse train of the voltage signal SA1 (illustrated in FIG. 5A) output from the rotation detecting brush BD1, because the magnitude of the current flowing through the rotor coils connected to respective conductive pieces of the commutator instantaneously varies when the conductive pieces of the commutator (also in contact with the rotation detecting brush BD1) change contact from one brush to another, the above-described variation of the current is caused by the voltage generated by a self-induced voltage in the rotor coils. The peak value and width of the surge voltage waveform vary in accordance with the magnitude of the voltage and correspondingly varies in accordance with magnitude of the current flowing through the rotor coils corresponding to the rotation speed of the DC motor M1.

The inclined portion of each pulse is composed of superposing the voltage generated by current flowing through the rotor coils due to the DC resistive components of the rotor coils with the induction voltage induced by the action of the rotor coils' rotation in the magnetic field. The latter induction voltage turns out to be dominant at the time of the high speed rotation of the DC motor M1, and the former voltage generated by the current flowing through the rotor coils due to the DC resistive components of the rotor coils turns out to be dominant at the time of the low speed rotation of the DC motor M1. Therefore, as illustrated in FIGS. 5A and 5B, the lower the speed of rotation becomes, the smaller the inclination angle of each pulse becomes.

In the waveform of the output signal SB1 from the noise removing circuit A illustrated in FIG. 5B, the above-described surge waveform and high-frequency noise such as for example mechanical noise, caused by the contact of the rotation detecting brush BD1 with the commutator, are removed. The comparator 3 compares a voltage of the output signal SB1 from the noise removing circuit 1A with the reference voltage (e.g., about Eo/4) taken out from the potentiometer VR1.

Referring to FIG. 5C, the output signal SC1 from the comparator 3 is alternately only one of two voltage levels, that is, the power supply voltage Vcc (high level) and the common low-voltage (low level). Consequently, a stable rectangular waveform is obtained.

The noise removing circuit 1A is suitably constructed according to property of the used DC motor, electric power consumed by the DC motor, and voltage of a signal processing circuit system, etc. Further, the noise removing circuit 1A may be a dispensable structure. Depending on the property of the used DC motor, the electric power consumed by the DC motor, and the voltage of the signal processing circuit system, etc., the noise removing circuit 1A may be omitted.

Figure 6:
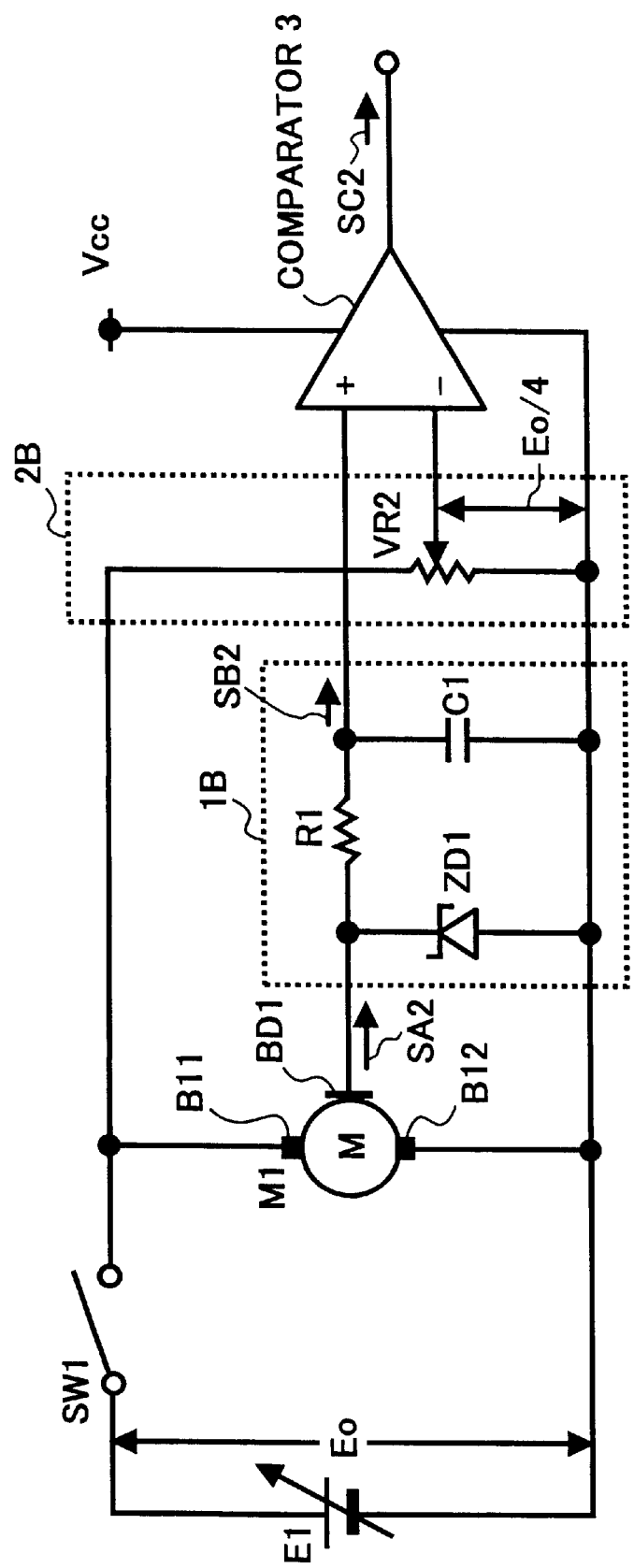
FIG. 6 is a circuit diagram illustrating another example of a DC motor rotation detecting apparatus.

Next, referring to FIG. 6, another example of a DC motor rotation detecting apparatus that detects a rotational operation of a DC motor is described.

Similarly as the DC motor rotation detecting apparatuses of FIGS. 3 and 4, the DC motor rotation detecting apparatus illustrated in FIG. 6 detects the rotational operation of the DC motor M1 that is driven by being applied with the drive voltage E0 from the drive power supply E1 through the switch SW1. The DC motor M1 includes one rotation detecting brush BD1 in addition to the pair of electrode brushes B1 and B12. The DC motor rotation detecting apparatus of FIG. 6 includes a noise removing circuit 1B, a reference voltage generating device 2B, and the comparator 3.

Similarly as the noise removing circuit A of FIG. 4, the noise removing circuit 1B includes the constant-voltage diode ZD1, the resistor R1, and the capacitor C1. The noise removing circuit 1B removes noise components such as the waveform in a state of a sharp surge from the signal detected by the rotation detecting brush BD1 and applies the detecting signal voltage to the comparator 3.

The constant-voltage diode ZD1 (e.g., Zener diode, etc.) is connected across the rotation detecting brush BD1 and the common low-voltage side of the drive power supply E1.

The resistor R1 and the capacitor C1 are connected in series. One side of the resistor R1 is connected to the rotation detecting brush BD1, and the capacitor C1 is connected to the common low-voltage side of the drive power supply E1. The series circuit of the resistor R1 and the capacitor C1 is connected in parallel with the constant-voltage diode ZD1 across the rotation detecting brush BD1 and the common low-voltage side of the drive power supply E1.

A voltage between both terminals of the capacitor C1, that is, a voltage between a connection point of the capacitor C1 and the resistor R1 and the common low-voltage side of the drive power supply E1, is applied to a non-inversion input terminal (i.e., positive side) of the comparator 3.

The reference voltage generating device 2B generates a reference voltage for converting the detection signal generated by the rotation detecting brush BD1 into a pulse train of a pulse period and a pulse width corresponding to the rotation speed of the DC motor M1, and then applies the reference voltage to the comparator 3. The reference voltage generating device 2B includes a potentiometer VR2 similar to the reference voltage generating device 2A of FIG. 4. The both terminals at both fixed sides of the potentiometer VR2 are connected between the electrode brushes B11 and B12 of the DC motor M1. A voltage between the movable terminal of the potentiometer VR2 and the common low-voltage side (e.g., a reference voltage almost equal to Eo/4) is applied to an inversion input terminal (i.e., negative side) of the comparator 3.

The comparator 3 of FIG. 6 has substantially the same construction as the ones of FIGS. 3 and 4. In the comparator 3, the voltage of the detection signal generated by the rotation detecting brush BD1 from which the noise is removed by the noise removing circuit 1B is applied to the non-inversion input terminal (i.e., positive side), and the reference voltage (Eo/4) generated by the reference voltage generating device 2B is applied to the inversion input terminal (i.e., negative side). The comparator 3 compares the above-described voltage of the detection signal with the reference voltage (Eo/4).

When an output voltage from the noise removing circuit 1B exceeds the reference voltage (Eo/4), the comparator 3 outputs a power supply voltage Vcc (i.e., high level), and when the output voltage from the noise removing circuit 1B equals to the reference voltage (Eo/4) or smaller, the comparator 3 outputs a common low-voltage (i.e., low level). The comparator 3 outputs a pulse train of a pulse period and a pulse width corresponding to the rotation speed of the DC motor M1.

Next, an operation of the DC motor rotation detecting apparatus of FIG. 6 is described referring to FIGS. 7A through 7C. FIG. 7A is a diagram illustrating waveform of an output signal SA2 from the rotation detecting brush BD1 when the drive voltage Eo for driving the DC motor M1 gradually drops. FIG. 7B is a diagram illustrating waveform of an output signal SB2 from the noise removing circuit 1B when the drive voltage Eo for driving the DC motor M1 gradually drops. FIG. 7C is a diagram illustrating waveform of an output signal SC2 from the comparator 3 when the drive voltage Eo for driving the DC motor M1 gradually drops.

The point of difference between each construction of the DC motor rotation detecting apparatuses of FIGS. 4 and 6 is that the power supply for the reference voltage generating device 2B is made the same as the drive power supply for the DC motor M1 in FIG. 6.

As illustrated in FIGS. 7A and 7B, when the drive voltage Eo for driving the DC motor M1 gradually drops, the voltage of the output signal SA2 of the rotation detecting brush BD1 and the voltage of the output signal SB2 of the noise removing circuit 1B gradually drop corresponding to the changes of the drive voltage Eo. In this case, if the load torque imposed on the DC motor M1 is constant, the rotation speed of the DC motor M1 becomes gradually low.

However, because the output voltage of the potentiometer VR2 as the reference voltage has dropped in proportion to the drive voltage Eo, the relative magnitude relation (i.e., the ratio) between the inversion input and non-inversion input of the comparator 3 is kept almost constant. Therefore, a stable rectangular waveform can be obtained irrespective of variation of the voltage Eo applied across both terminals of the DC motor M1 as the waveform of the output signal SC2 from the comparator 3.

In the apparatus using the DC motor, the rotation speed of the DC motor is often controlled by changing the voltage applied to the DC motor, i.e., by controlling the torque generated by the DC motor. In the apparatus using a battery as a power source, the voltage applied across both terminals of the DC motor varies frequently. In the DC motor rotation detecting apparatus of FIG. 6, even when the voltage applied across both terminals of the DC motor varies, stable rotation detecting signals can be obtained.

Figure 8:
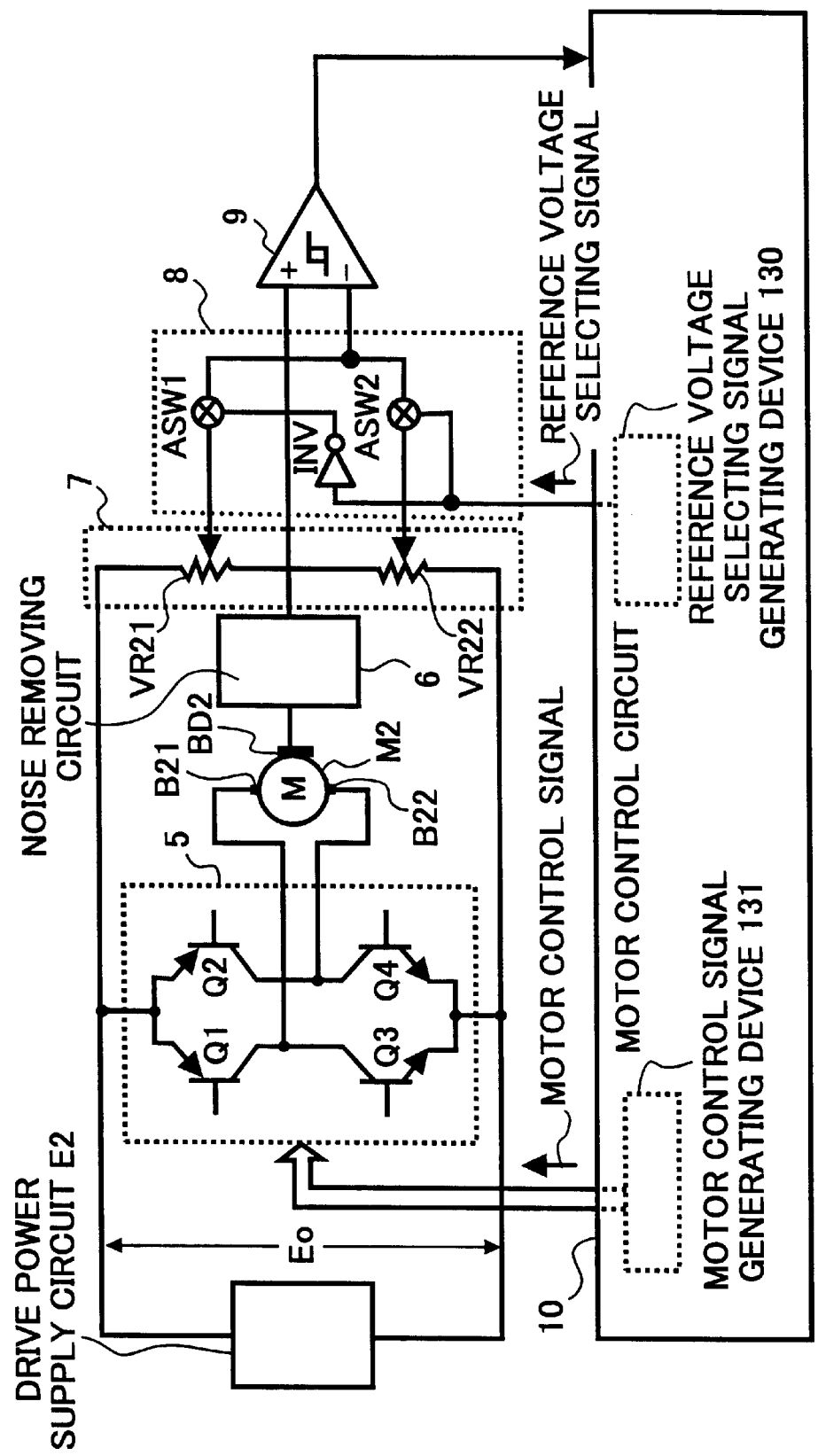
FIG. 8 is a circuit diagram illustrating an example of a DC motor rotation control apparatus.

FIG. 8 illustrates an example of a DC motor rotation control apparatus that controls a rotational operation of a DC motor. The DC motor rotation control apparatus of FIG. 8 includes a motor driving circuit 5, a noise removing circuit 6, a reference voltage generating device 7, a reference voltage selecting device 8, a comparator 9, and a motor control circuit 10 in addition to a DC motor M2 and a drive power supply circuit E2.

The DC motor rotation control apparatus of FIG. 8 controls the rotation speed of the DC motor M2 that is driven by being supplied with a drive electric power from the drive power supply circuit E2 through the motor driving circuit 5. The DC motor M2 includes one rotation detecting brush BD2 in addition to a pair of electrode brushes B21 and B22.

The motor driving circuit 5 including a switching section constructing a bridge circuit composed of four transistors Q1, Q2, Q3, and Q4 is connected to the positive and negative output terminals of the drive power supply circuit E2 constructed with the DC power supply of voltage Eo.

The electrode brush B21 of the DC motor M2 is connected to one of the output terminals of the motor driving circuit 5, i.e., a connection point of a collector of the transistor Q1 and a collector of the transistor Q3. The other electrode brush B22 of the DC motor M2 is connected to the other output terminal of the motor driving circuit 5, i.e., a connection point of a collector of the transistor Q2 and a collector of the transistor Q4.

Four control input terminals of the motor driving circuit 5 are connected to the motor control circuit 10. Turning on/off the transistors Q1 through Q4, forward/reverse rotations of the DC motor M2, and the rotation stop of the DC motor M2 are controlled in accordance with motor control signals generated by a motor control signal generating device 12 of the motor control circuit 10.

The output signal generated from the rotation detecting brush BD2 of the DC motor M2 is input to the noise removing circuit 6, and the voltage of the output signal generated from the noise removing circuit 6 is applied to a non-inversion input terminal (i.e., the positive side) of the comparator 9. The noise removing circuit 6 removes high frequency noise components from the detected voltage on the commutator.

The reference voltage generating device 7 includes potentiometers VR21 and VR22 in series. The series circuit of the potentiometers VR21 and VR22 is connected to the drive power supply circuit E2 in parallel with the motor driving circuit 5.

Specifically, the output terminals of respective potentiometers VR21 and VR22 respectively generate different voltages both proportional to the power supply voltage Eo. For example, the output terminal of the potentiometer VR21 takes out the voltage almost equal to 3Eo/4 between the movable terminal of the potentiometer VR21 and the common low-voltage side, and the output terminal of the potentiometer VR22 takes out the voltage almost equal to Eo/4 between the movable terminal of the potentiometer VR22 and the common low-voltage side.

The reference voltage selecting device 8 includes two analog switches ASW1 and ASW2 and one inverter INV. The output voltage taken out from the movable terminal of the potentiometer VR21 is applied to the input terminal of the analog switch ASW1, and the output voltage taken out from the movable terminal of the potentiometer VR22 is applied to the input terminal of the analog switch ASW2. Respective output terminals of the analog switches ASW1 and ASW2 are connected to the inversion input terminal (i.e., the negative side) of the comparator 9.

A reference voltage selecting signal as a control signal generated from a reference voltage selecting signal generating device 11 of the motor control circuit 10 is inverted by the inverter INV and is applied to a control terminal of the analog switch ASW1. Further, the reference voltage selecting signal is directly applied to a control terminal of the analog switch ASW2.

Specifically, the analog switches ASW1 and ASW2 are controlled such that one of the switches ASW1 and ASW2 is turned on and the other is turned off by the reference voltage selecting signal generated from the reference voltage selecting signal generating device 11. Then, only one of the output voltages of the potentiometers VR21 and VR22 is applied to the inversion input terminal of the comparator 9. The voltage of output signal from the comparator 9 is applied to the motor control circuit 10.

The motor control circuit 10 includes a microcomputer (not shown), the reference voltage selecting signal generating device 11, the motor control signal generating device 12, and etc. The motor control circuit 10 receives the output signal from the comparator 9, and, if necessary, a control command signal from an external device (not shown). The motor control signal generating device 12 generates the motor control signal to be applied to the motor driving circuit 5, and the reference voltage selecting signal generating device 11 generates the reference voltage selecting signal to be applied to the reference voltage selecting device 8.

The analog switches ASW1 and ASW2 are respectively turned on or turned off, in accordance with the signal state of the respective control terminals; High "H" or Low "L". In one of the both analog switches, when the state of the analog switch is "ON", the voltage applied to the input terminal is directly output to the output terminal. On the contrary, when the state of the analog switch is "OFF", the voltage applied to the input terminal is not output to the output terminal.

Specifically, for example, when the control terminal is "H", the state of the analog switch becomes "ON". In such the state, the input signal directly passes through the analog switch. When the control terminal is "L", the analog switch is turned off, and placed in a high-impedance state.

Specifically, for example, when the control terminal is in the state of "High", the analog switches ASW1 and ASW2 are put in on-state and the input signals pass therethrough. When the control terminal is in the state of "Low", the analog switches ASW1 and ASW2 are placed in an off-state and placed in the high-impedance state.

Figure 9:
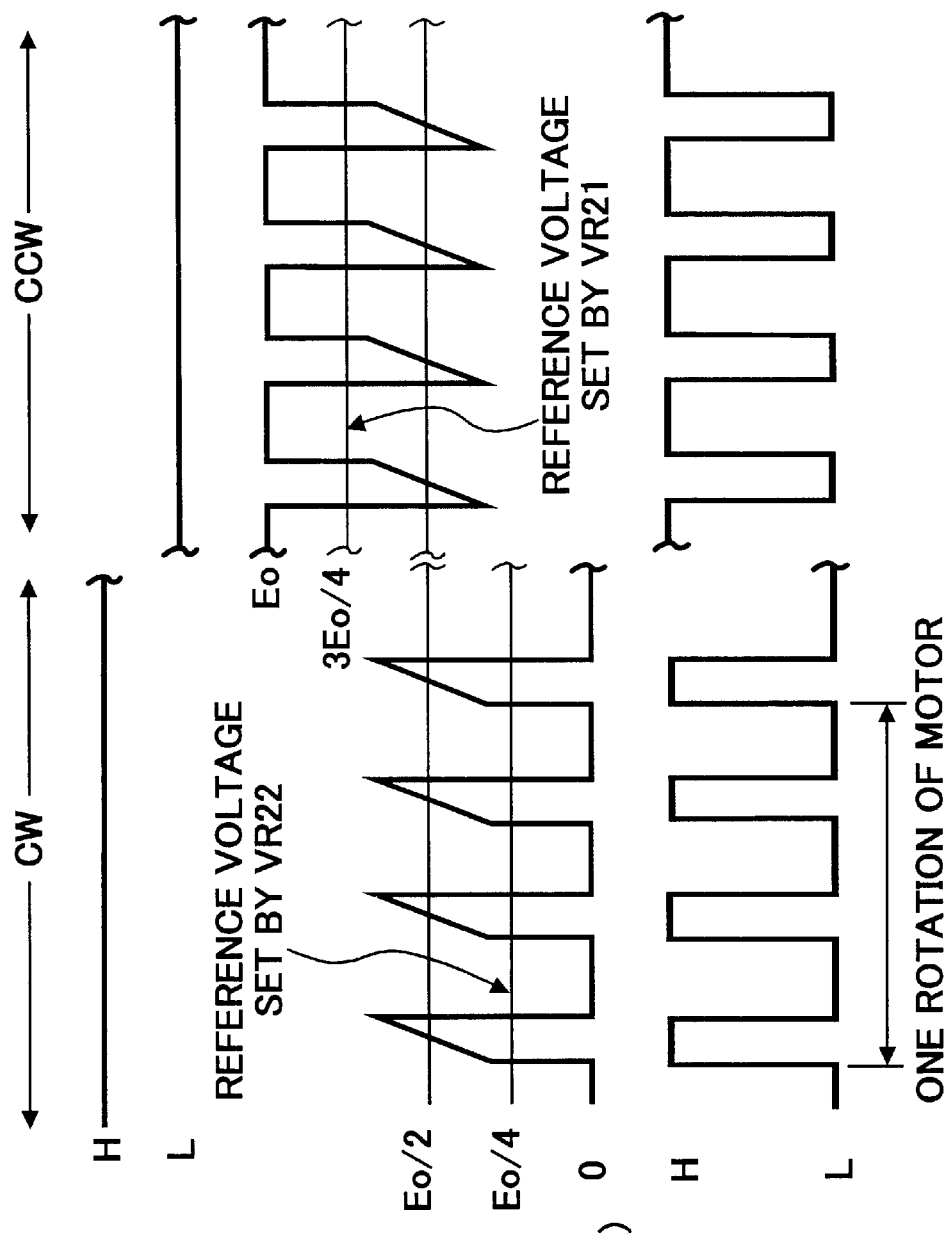
FIG. 9A is a diagram illustrating waveform of a reference voltage selecting signal generated by a reference voltage selecting signal generating device.
FIG. 9B is a diagram illustrating waveform of an input signal to an inversion input terminal of the comparator.
FIG. 9C is a diagram illustrating waveform of an output signal from the comparator.

Next, an operation of the DC motor rotation control apparatus of FIG. 8 is described referring to FIGS. 9A through 9C.

FIG. 9A is a diagram illustrating waveform of a reference voltage selecting signal generated by the reference voltage selecting signal generating device 11 when the DC motor M2 rotates in the clockwise (CW) and counter-clockwise (CCW) directions. FIG. 9B is a diagram illustrating waveform of an input signal to the inversion input terminal of the comparator 9 when the DC motor M2 rotates in the clockwise (CW) and counter-clockwise (CCW) directions. FIG. 9C is a diagram illustrating waveform of an output signal from the comparator 9 when the DC motor M2 rotates in the clockwise (CW) and counter-clockwise (CCW) directions.

When the motor control signal is output from the motor control signal generating device 12, and the transistors Q1 and Q4 of the motor driving circuit 5 are turned on, the DC motor M2 rotates in the clockwise direction. Almost simultaneously, the reference voltage selecting signal "H" is output from the reference voltage selecting signal generating device 11 (FIG. 9A). Then, the voltage of the rotation detecting signal generated by the rotation detecting brush BD2 of the DC motor M2 is applied to the non-inversion input terminal of the comparator 9 through the noise removing circuit 6.

On the other hand, the reference voltage is applied to the inversion input terminal of the comparator 9. In such the state, because the reference voltage selecting signal is "H", the analog switch ASW1 is turned off, and the analog switch ASW2 is turned on, the voltage Eo/4 set by the potentiometer VR22 is selected as the reference voltage (FIG. 9B). As a result, a rectangular waveform of the output signal from the comparator 9 is obtained as illustrated in FIG. 9C.

When the motor control signal is output from the motor control signal generating device 12, and the transistors Q2 and Q3 of the motor driving circuit 5 are turned on, the DC motor M2 rotates in the counter-clockwise direction. Almost simultaneously, the reference voltage selecting signal "L" is output from the reference voltage selecting signal generating device 11 (FIG. 9A). Then, the voltage of the rotation detecting signal generated by the rotation detecting brush BD2 of the DC motor M2 is applied to the non-inversion input terminal of the comparator 9 through the noise removing circuit 6.

On the other hand, the reference voltage is input to the inversion input terminal of the comparator 9. In such the state, because the reference voltage selecting signal is "L", and the analog switch ASW1 is turned on and the analog switch ASW2 is turned off, the voltage 3Eo/4 set by the potentiometer VR21 is selected as the reference voltage (FIG. 9B). As a result, a rectangular waveform of the output signal from the comparator 9 is obtained as illustrated in FIG. 9C.

As such, the pulse train as the rotation signal of the DC motor M2 is obtained from the output terminal of the comparator 9. For example, when the angle between the rotation detecting brush BD2 and the electrode brush B22 is 40°, the duty of the pulse becomes ⅓ at the time of the clockwise rotation of the DC motor M2, while the duty of the pulse becomes ⅔ at the time of the counter-clockwise rotation thereof.

With the above-described construction of the DC motor rotation control apparatus, stable rotation signals can be obtained in bi-directional rotations of the DC motor M2. As a result, the rotation speed of the DC motor M2 can be properly controlled.

Figure 10:
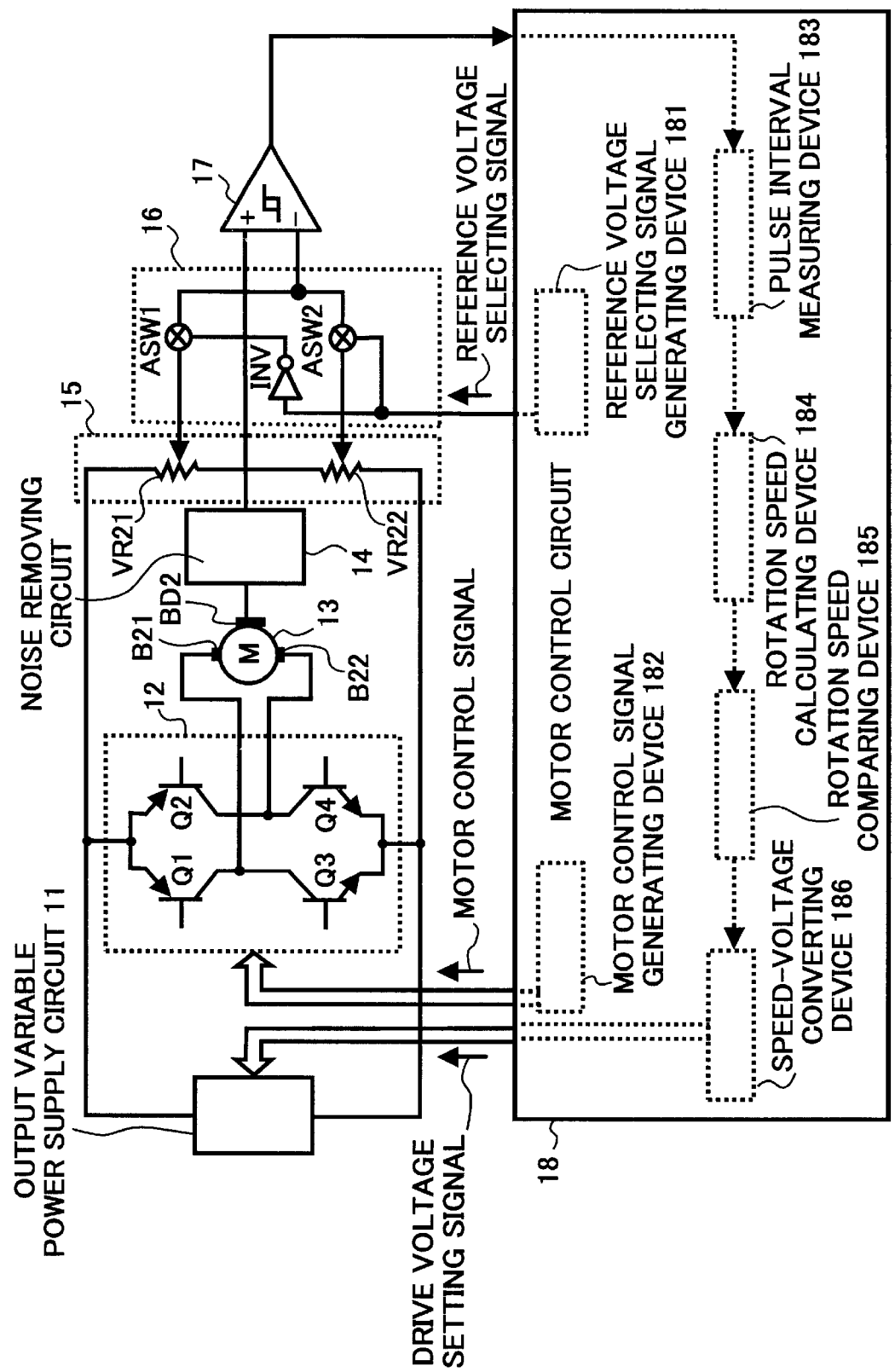
FIG. 10 is a circuit diagram illustrating a DC motor rotation control apparatus according to a first embodiment of the present invention.

FIG. 10 illustrates a construction of a DC motor rotation control apparatus that controls the rotational operation of the DC motor according to a first embodiment of the present invention. In the DC motor rotation control apparatus of FIG. 8, the output voltage of the drive power supply circuit E2 is constant, and the rotation of the DC motor M2 is controlled by the switching control of the motor driving circuit 5. On the other hand, an output voltage of a drive power supply circuit of FIG. 10 corresponding to the drive power supply circuit E2 of FIG. 8 is variable.

The DC motor rotation control apparatus illustrated in FIG. 10 includes an output variable power supply circuit 11, a motor driving circuit 12, a DC motor 13, a noise removing circuit 14, a reference voltage generating device 15, a reference voltage selecting device 16, a comparator 17, and a motor control circuit 18. The motor driving circuit 12, the DC motor 13, the noise removing circuit 14, the reference voltage generating device 15, the reference voltage selecting device 16, and the comparator 17 illustrated in FIG. 10 have similar constructions to the motor driving circuit 5, the DC motor M2, the noise removing circuit 6, the reference voltage generating device 7, the reference voltage selecting device 8, and the comparator 9 illustrated in FIG. 8, respectively.

The motor control circuit 18 applies a motor control signal to the motor driving circuit 12 and applies a drive voltage setting signal corresponding to a required rotation speed of the DC motor 13 to the output variable power supply circuit 11 based on the output signal of the comparator 17.

The output variable power supply circuit 11 controls a voltage to be applied to the motor driving circuit 12 in accordance with the drive voltage setting signal so as to rotate the DC motor 13 at a required rotation speed. The motor driving circuit 12 includes the same bridge circuit composed of four transistors Q1, Q2, Q3, and Q4 as that of the motor driving circuit 5 of FIG. 8. The DC motor 13 includes the rotation detecting brush BD2 in addition to the pair of electrode brushes B21 and B22.

The motor control circuit 18 includes a microcomputer (not shown), a reference voltage selecting signal generating device 181, a motor control signal generating device 182, a pulse interval measuring device 183, a rotation speed calculating device 184, a rotation speed comparing device 185, a speed-voltage converting device 186, etc.

The reference voltage selecting signal generating device 181 generates a reference voltage selecting signal and applies the reference voltage selecting signal to the reference voltage selecting device 16. The motor control signal generating device 182 generates a motor control signal and applies the motor control signal to the motor driving circuit 12.

The pulse interval measuring device 183 measures a pulse interval $T_M$ of output pulses of the comparator 17, and supplies the pulse interval $T_M$ to the rotation speed calculating device 184. The method of measuring the pulse interval $T_M$ by use of the pulse interval measuring device 183 is to count with a clock having sufficiently higher frequency than that of the rotation signal pulse of the DC motor 13 the output from the comparator 9 as illustrated in FIG. 12A during one period of the rotation signal pulse. In FIG. 12B, "Tax" represents one period of the clock. The pulse interval $T_M$ signifies "Tax X count number".

The rotation speed calculating device 184 calculates the rotation speed of the rotor, i.e., the DC motor 13 based on the pulse interval $T_M$ obtained by the pulse interval measuring device 183. When the period of the rotation signal pulse obtained by the pulse interval measuring device 183, that is, the pulse interval is $T_M$<sec>, the rotation speed of the DC motor 13 is calculated by the rotation speed calculating device 184. The calculated value is $60/3T_M$<rpm> in the case of the three-pole motor. The clock is generated by a clock oscillator (not shown) contained in the microcomputer (not shown) of the motor control circuit 18.

The rotation speed comparing device 185 compares a present rotation speed N1 calculated by the rotation speed calculating device 184 with a target speed N2. Based on the comparison result of the present rotation speed N1 and the target speed N2, the speed-voltage converting device 186 obtains a drive voltage which enables the present rotation speed N1 of the DC motor 13 to reach the target speed N2, and applies the drive voltage setting signal to the output variable power supply circuit 11.

Figure 11:
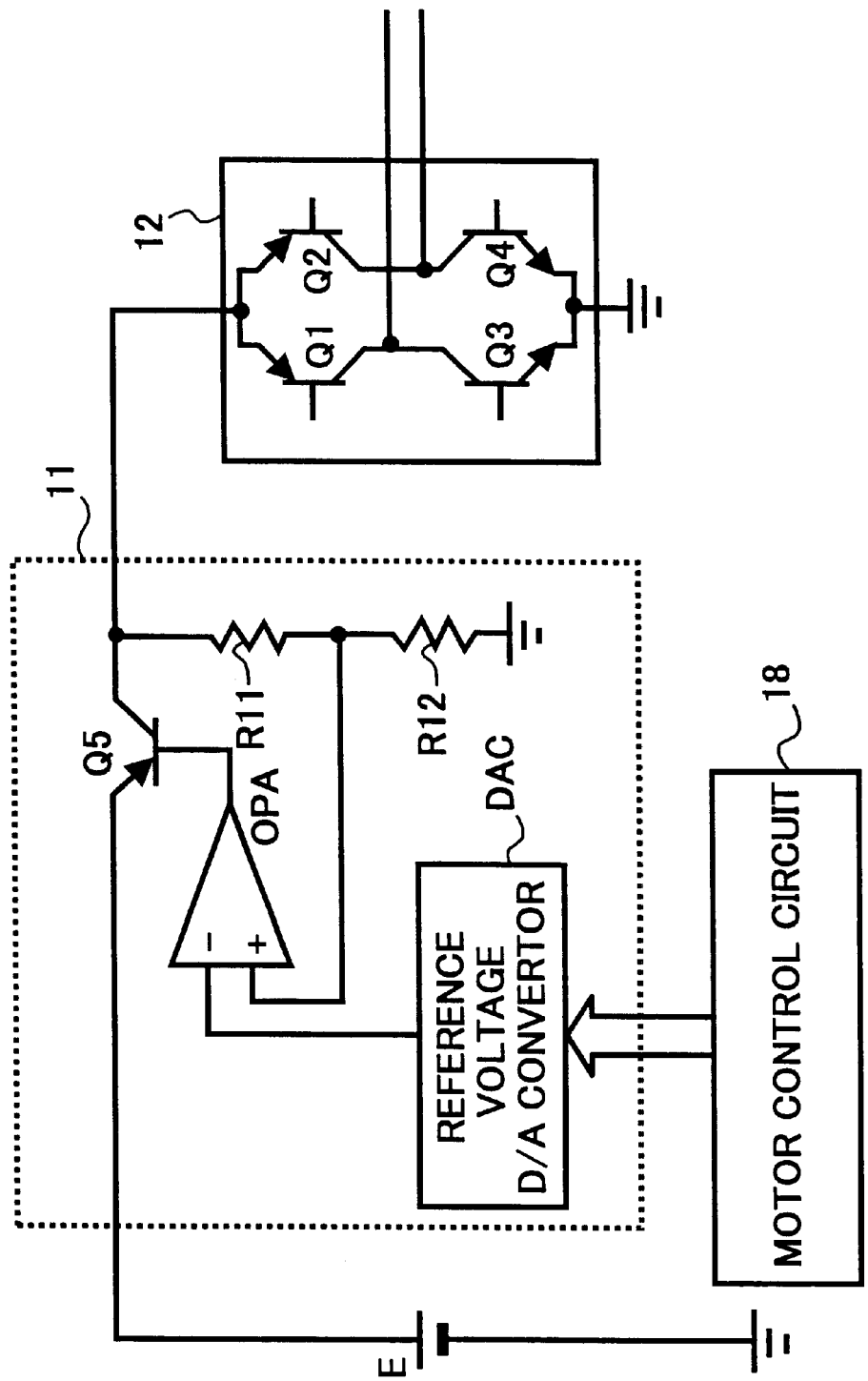
FIG. 11 is a circuit diagram illustrating an output variable power supply circuit of the DC motor rotation control apparatus of FIG. 10.

As illustrated in detail in FIG. 11, the output variable power supply circuit 11 includes an operational amplifier OPA, a pnp transistor Q5, a D/A (digital/analog) converter DAC, resistors R11 and R12, and constructs a so-called series regulator. The D/A converter DAC generates a reference voltage to be applied to an inversion input terminal of the operational amplifier OPA in accordance with the drive voltage setting signal applied from the speed-voltage converting device 186 of the motor control circuit 18.

In the transistor Q5, a DC voltage is applied to an emitter of the transistor Q5 from a DC power supply E, and an output voltage of the operational amplifier OPA is applied to a base of the transistor Q5. Further, an output voltage of a collector of the transistor Q5 is applied to the motor driving circuit 12. The output voltage of the collector is divided by the resistors R11 and R12 connected in series between the collector and the common low-voltage side. The voltage at the connection point of the resistors R11 and R12 is fed back to a non-inversion input terminal of the operational amplifier OPA.

Figure 13:
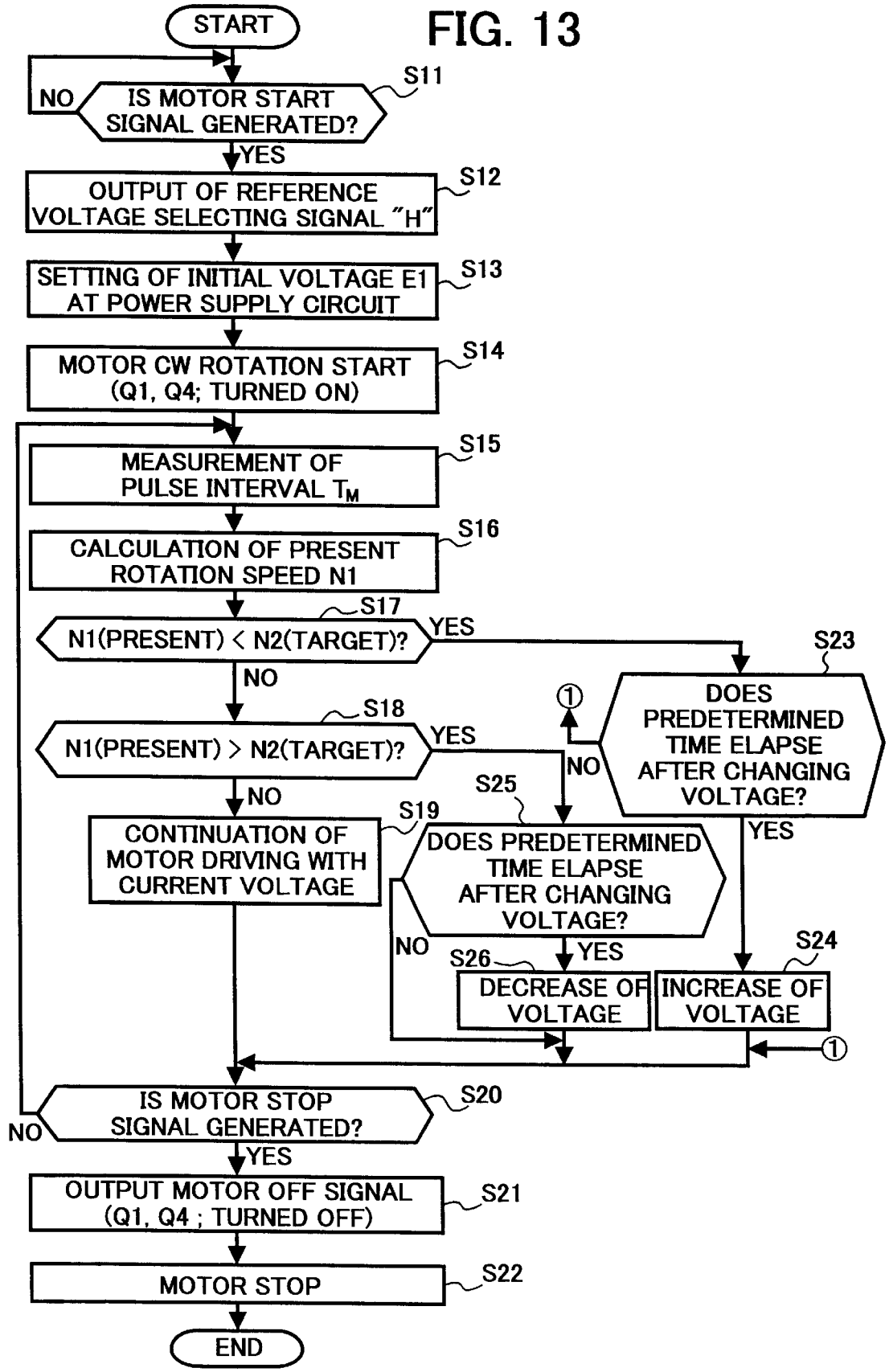
FIG. 13 is a flowchart illustrating main steps of a motor rotation control operation of the DC motor rotation control apparatus according to the first embodiment of the present invention.
Figure 14:
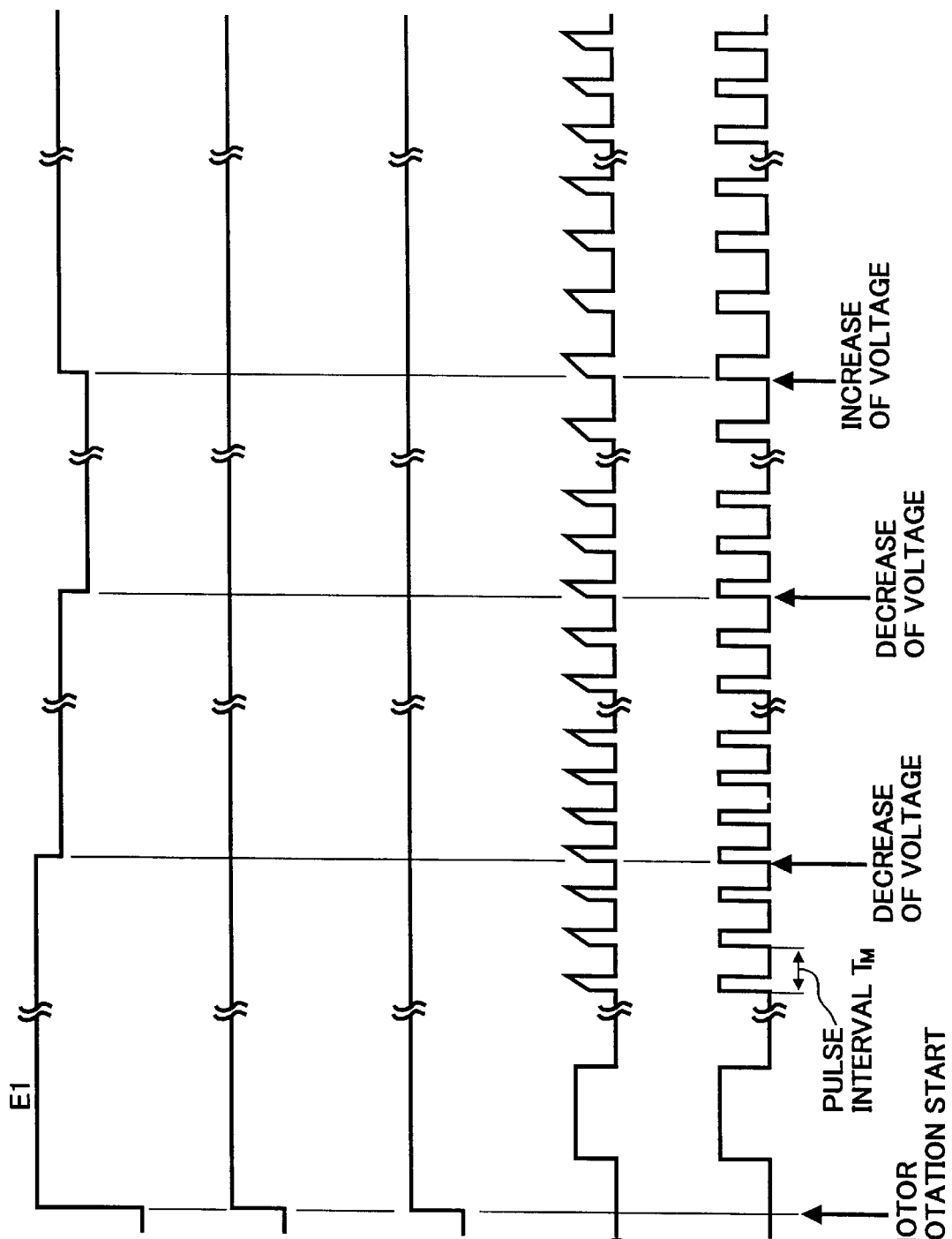
FIG. 14A is a diagram illustrating a waveform of an output voltage of a power supply circuit.
FIG. 14B is a diagram illustrating a waveform of an on/off control signal of a transistor Q1.
FIG. 14C is a diagram illustrating a waveform of an on/off control signal of a transistor Q4.
FIG. 14D is a diagram illustrating a waveform of a signal input to a non-inversion input terminal of a comparator.
FIG. 14E is a diagram illustrating a waveform of an output signal from the comparator.

Next, an operation of the DC motor rotation control apparatus of FIG. 10 is described referring to FIG. 13 and FIGS. 14A through 14E. FIG. 13 is a flowchart illustrating main steps of the operation of controlling the rotation speed of the DC motor 13. FIG. 14A is a diagram illustrating a waveform of an output voltage of the power supply circuit 11. FIG. 14B is a diagram illustrating a waveform of an on/off control signal of the transistor Q1. FIG. 14C is a diagram illustrating a waveform of an on/off control signal of the transistor Q4. FIG. 14D is a diagram illustrating a waveform of a signal input to the non-inversion input terminal of the comparator 17 (i.e., an output signal of the rotation detecting brush BD2). FIG. 14E is a diagram illustrating a waveform of an output signal from the comparator 17.

Respective signals illustrated in FIGS. 14A through 14E are generated in the state that the DC motor 13 is rotated by performing a DC control. When the DC motor 13 is rotated, rotation signal pulses of the DC motor 13 are output from the output terminal of the comparator 17 corresponding to the rotation of the DC motor 13.

Hereinafter, main steps of the operation of controlling the rotation speed of the DC motor (hereinafter simply referred to as a motor rotation control operation) are described referring to FIG. 13.

In step S11, the motor control circuit 18 judges if a motor start signal is generated from an external device (not shown) or not. If the answer is YES in step S11, the reference voltage selecting signal generating device 181 outputs the reference voltage selecting signal "H" to the reference voltage selecting device 16 in step S12. If the answer is NO in step S11, the motor rotation control operation returns to reexecute step S11. At almost the same timing of the output of the reference voltage selecting signal "H", a predetermined initial drive power supply voltage E1 is set at the output variable power supply circuit 11 in accordance with the drive voltage setting signal applied from the speed-voltage converting device 186 in step S13.

Almost simultaneously, the transistors Q1 and Q4 of the motor driving circuit 12 are turned on in accordance with the motor control signal generated from the motor control signal generating device 182, and a voltage almost equal to the power supply voltage E1 is applied to the electrode brushes B21 and B22 of the DC motor 13. Thereby, the DC motor 13 starts rotating in the clockwise direction in step S14.

As described earlier, the reference voltage selecting signal generating device 181 outputs the reference voltage selecting signal "H" to the reference voltage selecting device 16, and a reference voltage of, for example, Eo/4 is applied to the inversion input terminal of the comparator 17. As a result, rotation signal pulses of the rotation detecting brush BD2 of the DC motor 13 are output from the output terminal of the comparator 17 corresponding to the rotation of the DC motor 13.

Further, the pulse interval measuring device 183 measures the pulse interval $T_M$ based on the rotation signal pulses output from the comparator 17 in step S15. Based on the measurement result of the pulse interval $T_M$, the rotation speed calculating device 184 calculates a present rotation speed N1 of the DC motor 13 in step S16.

Then, the rotation speed comparing device 185 compares the present rotation speed N1 calculated by the rotation speed calculating device 184 with a target rotation speed N2, and judges if the present rotation speed N1 is lower than the target rotation speed N2 in step S17.

The rotation of the DC motor M2 is slow-speed upon starting of the DC motor. However, if the motor drive voltage continues to be applied to the DC motor 13, the rotation of the DC motor 13 is increased in accordance with the time constant of the motor driving circuit 12, and then the rotation speed of the DC motor 13 becomes constant when the torque generated by the DC motor 13 and the load torque are balanced with each other.

If the answer is NO in step S17, the rotation speed comparing device 185 judges if the present rotation speed N1 exceeds the target rotation speed N2 in step S18.

If the answer is NO in step S18, the present rotation speed N1 equals to the target rotation speed N2. Therefore, the motor control circuit 18 continues to drive the DC motor 13 with the current drive power supply voltage in step S19.

Then, the motor control circuit 18 judges if a motor stop signal is generated from an external device (not shown) or not in step S20. If the answer is YES in step S20, the motor control signal generating device 182 outputs motor off signals to the motor driving circuit 12, and the transistors Q1 and Q4 are turned off in step S21. Then, the DC motor 13 stops rotating in step S22. If the answer is NO in step S20, the motor rotation control operation returns to reexecute step S15.

If the answer is YES in step S17, the motor control circuit 18 judges if a predetermined time elapses after the immediately-before drive power supply voltage is changed or not in step S23. If the answer is YES in step S23 or if the drive power supply voltage has not been changed at all, the speed-voltage converting device 186 outputs the drive voltage setting signal to the output variable power supply circuit 11 such that the drive power supply voltage is increased from the initial drive power supply voltage E1 or the immediately-before drive power supply voltage in step S24, and then the motor rotation control operation proceeds to step S20. If the answer is NO in step S23, the motor rotation control operation proceeds to step S20 without changing the drive power supply voltage of the output variable power supply circuit 11.

If the answer is YES in step S18, the motor control circuit 18 judges if a predetermined time elapses after the immediately-before drive power supply voltage is changed or not in step S25. If the answer is YES in step S25 or if the drive power supply voltage has not been changed at all, the speed-voltage converting device 186 outputs the voltage setting signal to the output variable power supply circuit 11 such that the drive power supply voltage is decreased from the initial drive power supply voltage E1 or the immediately-before drive power supply voltage in step S26, and then the motor rotation control operation proceeds to step S20. If the answer is NO in step S25, the motor rotation control operation proceeds to step S20 without changing the drive power supply voltage of the output variable power supply circuit 11.

In the above-described motor rotation control operation, unless the predetermined time elapses after changing the immediately-before drive power supply voltage, the drive power supply voltage is not changed. Because, it is considered that even though the drive power supply voltage is changed, the rotation speed of the DC motor 13 does not immediately vary, and the response of the DC motor 13 is delayed. In such the situation, the predetermined number of the pulse periods of the rotation signal pulses or the predetermined count number of the rotation signal pulses can be used instead of the predetermined time.

As described above, in the DC motor rotation control apparatus according to the first embodiment of the present invention, the rotation speed of the DC motor 13 is controlled by changing the drive power supply voltage of the output variable power supply circuit 11.

When the present rotation speed N1 is lower than the target rotation speed N2, the drive power supply voltage is increased so as to increase the rotation speed of the DC motor 13. On the contrary, when the present rotation speed N1 exceeds the target rotation speed N2, the drive power supply voltage is decreased so as to decrease the rotation speed of the DC motor 13.

Next, a DC motor rotation control apparatus that controls a rotational operation and a cumulative rotation number of the DC motor according to a second embodiment of the present invention is described. The DC motor rotation control apparatus of FIG. 15 has a similar construction to the DC motor rotation control apparatus of FIG. 10 employing a motor control circuit 19 instead of the motor control circuit 18.

The motor control circuit 19 includes a microcomputer (not shown), a reference voltage selecting signal generating device 191, a motor control signal generating device 192, a pulse interval measuring device 193, a rotation speed calculating device 194, a pulse number counting device 195, a cumulative rotation number calculating device 196, a remaining rotation number calculating device 197, a rotation speed switching device 198, and a speed-voltage converting device 199.

Respective functions of the reference voltage selecting signal generating device 191, the motor control signal generating device 192, the pulse interval measuring device 193, and the rotation speed calculating device 194 are almost similar to those of the reference voltage selecting signal generating device 181, the motor control signal generating device 182, the So pulse interval measuring device 183, the rotation speed calculating device 184 of the motor control circuit 18 illustrated in FIG. 10, respectively, and their descriptions are omitted.

The pulse number counting device 195 counts the number of the rotation signal pulses output from the comparator 17, and inputs the number of pulses to the cumulative rotation number calculating device 196. The cumulative rotation number calculating device 196 calculates the cumulative rotation number of the DC motor 13 from the rotation start of the DC motor 13, and inputs the cumulative rotation number to the remaining rotation number calculating device 197. Then, the remaining rotation number calculating device 197 calculates the remaining rotation number until reaching a target cumulative rotation number of the DC motor 13 corresponding to a target position of a member driven by the DC motor 13, and inputs the remaining rotation number to the rotation speed switching device 198.

The rotation speed switching device 198 switches a target rotation speed of the DC motor 13 when the remaining rotation number reaches a predetermined number, and compares a present rotation speed calculated by the rotation speed calculating device 194 with the target rotation speed. Based on the target rotation speed switched by the rotation speed switching device 198 and the comparison result of the present rotation speed and the target rotation speed by the rotation speed switching device 198, the speed-voltage converting device 199 obtains a drive voltage which enables the present rotation speed of the DC motor 13 to reach the target speed, and applies the drive voltage setting signal to the output variable power supply circuit 11.

Figure 15:
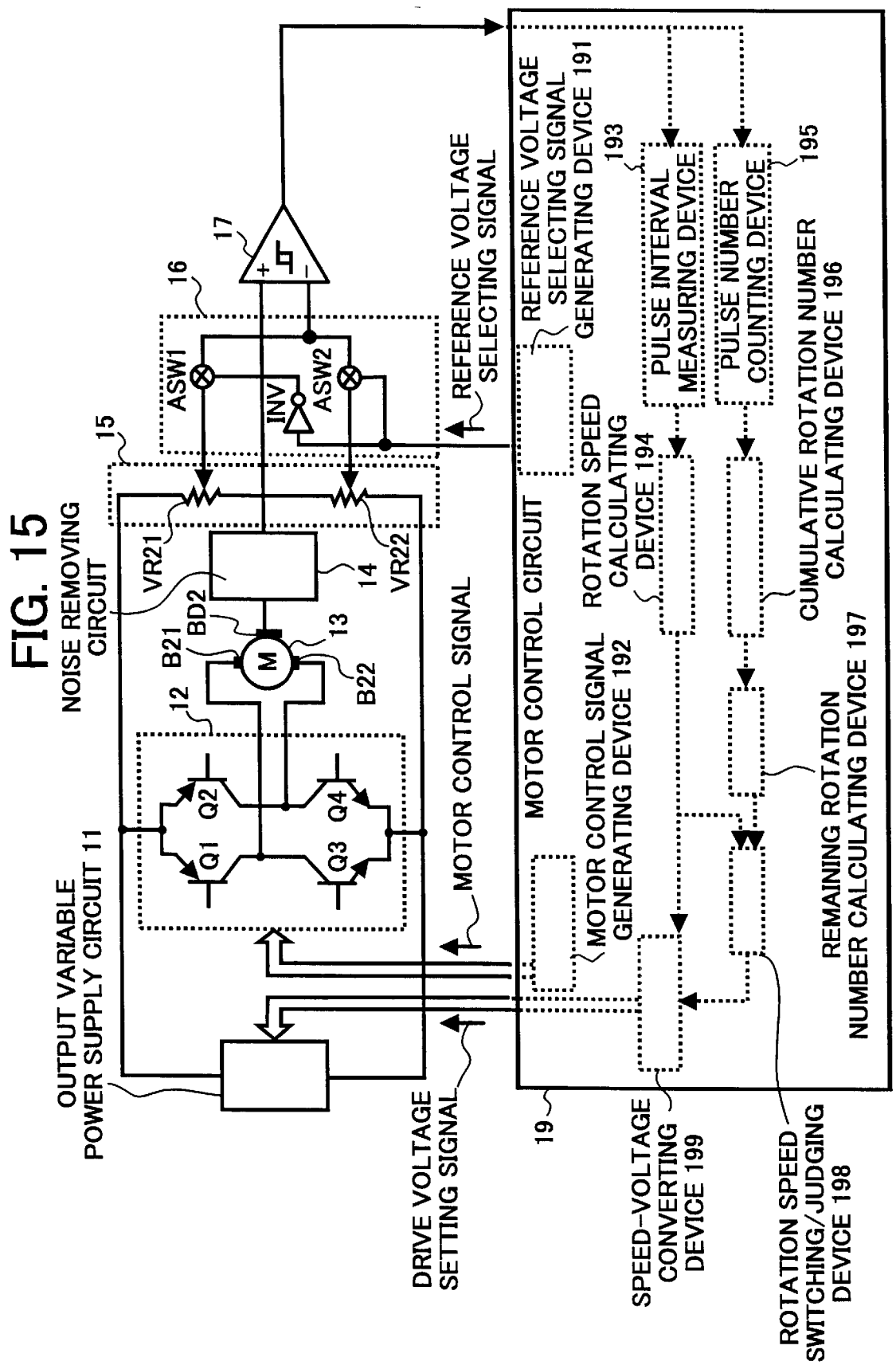
FIG. 15 is a circuit diagram illustrating a DC motor rotation control apparatus according to a second embodiment of the present invention.

The brief flows of the operation of the DC motor rotation control apparatus of FIG. 15 are that the DC motor 13 is driven to rotate at a high speed, for example, with a maximum drive power supply voltage first. In order to improve the stopping position accuracy of the DC motor 13, when the cumulative rotation number of the DC motor 13 from the rotation start thereof reaches a predetermined rotation number (R1), a target rotation speed of the DC motor 13 is switched to be lowered, so that the drive power supply voltage is lowered. During the rotations of the DC motor 13, the rotation speed is controlled by changing the drive power supply voltage. When the cumulative rotation number of the DC motor 13 from the switch of the target rotation speed reaches a predetermined rotation number (R2), the DC motor 13 is stopped.

Figure 16A:
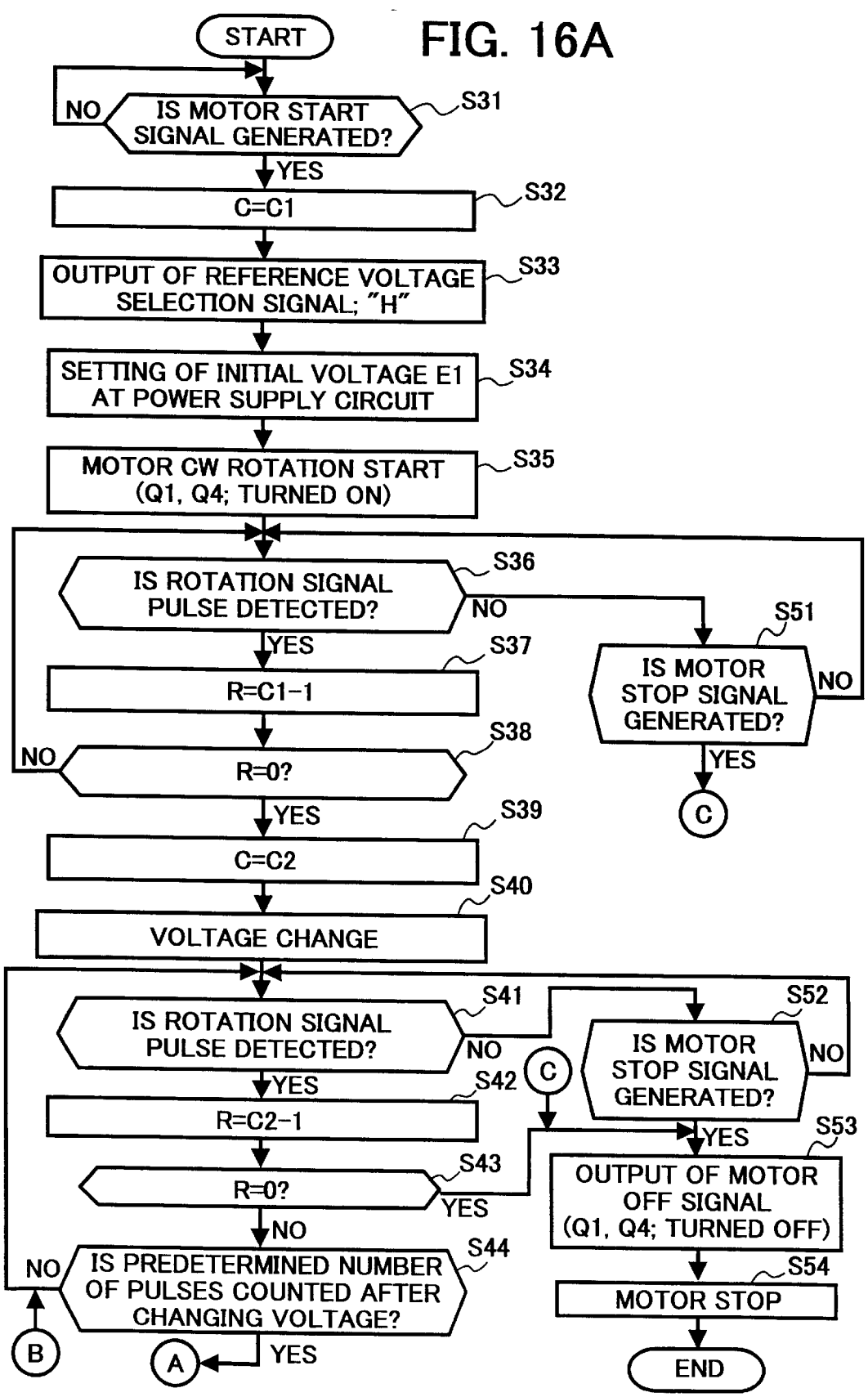
FIGS. 16A and 16B are flowcharts illustrating main steps of a motor rotation control operation of the DC motor rotation control apparatus according to the second embodiment of the present invention.
Figure 16B:
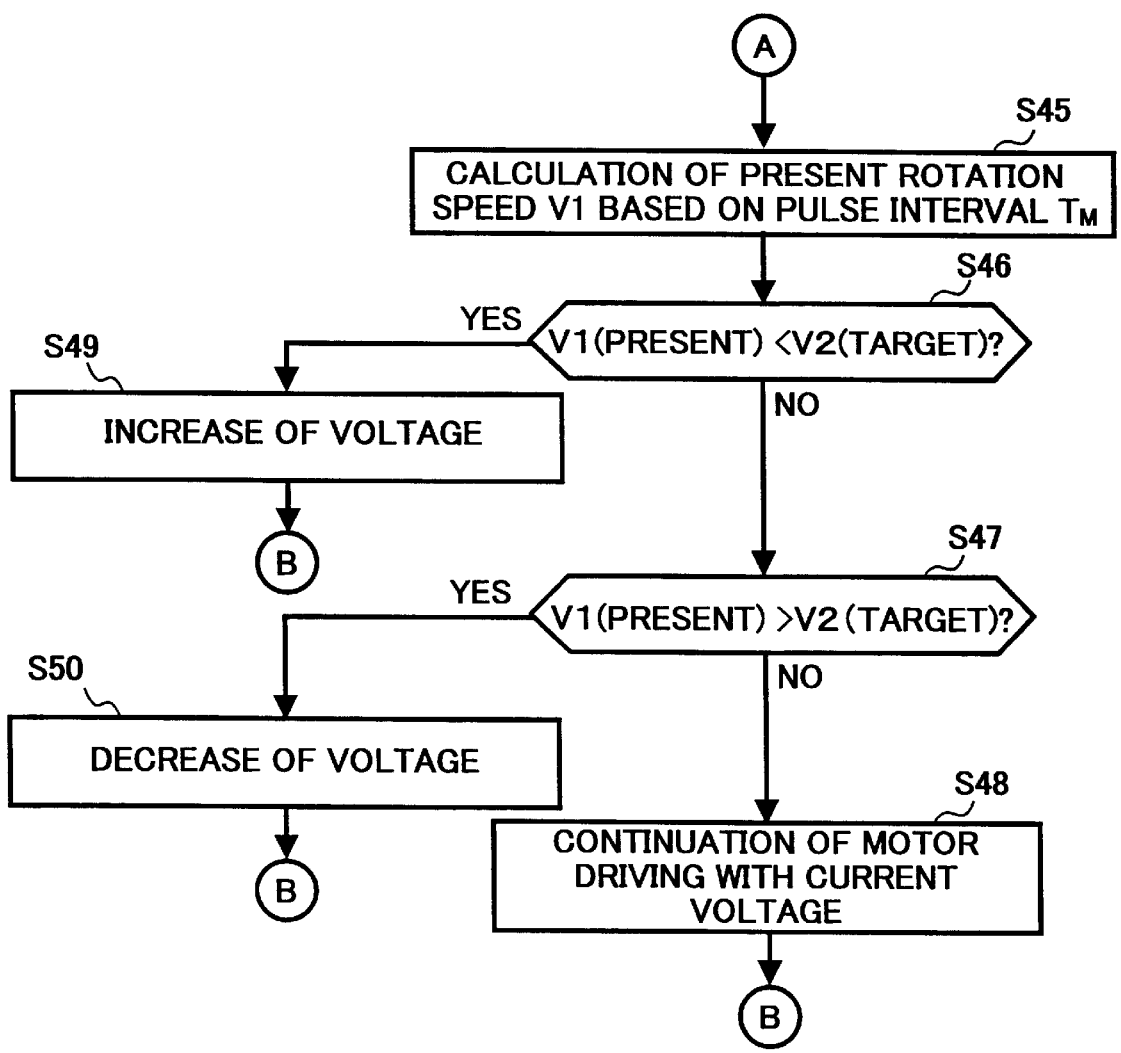

Next, an operation of the DC motor rotation control apparatus of FIG. 15 is described referring to FIGS. 16A and 16B, and FIGS. 17A through 17E. FIGS. 16A and 16B are a flowchart illustrating main steps of the operation of controlling the rotation speed and cumulative rotation number of the DC motor 13 (hereinafter simply referred to as a motor rotation control operation). FIG. 17A is a diagram illustrating a waveform of an output voltage of the power supply circuit. FIG. 17B is a diagram illustrating a waveform of an on/off control signal of the transistor Q1. FIG. 17C is a diagram illustrating a waveform of an on/off control signal of the transistor Q4. FIG. 17D is a diagram illustrating a waveform of a signal input to the non-inversion input terminal of the comparator 17 (i.e., an output signal of the rotation detecting brush BD2). FIG. 17E is a diagram illustrating a waveform of an output signal from the comparator 17.

In the flowchart of FIGS. 16A and 16B, for sake of clarity, a cumulative pulse number and a remaining pulse number are used instead of the above-described cumulative rotation number and the remaining rotation number, respectively.

In step S31, the motor control circuit 19 judges if a motor start signal is generated from an external device (not shown) or not. If the answer is YES in step S31, a first target cumulative pulse number "C" is set as a remaining pulse number C1 in the remaining rotation number calculating device 197 in step S32. If the answer is NO in step S31, the motor rotation control operation returns to reexecute step S31. Then, the reference voltage selecting signal generating device 191 outputs the reference voltage selecting signal "H" to the reference voltage selecting device 16 in step S33. Almost simultaneously, an initial drive power supply voltage E1, for example, a maximum drive power supply voltage is set at the output variable power supply circuit 11 in accordance with the drive voltage setting signal applied from the speed-voltage converting device 199 in step S34.

Almost simultaneously, the transistors Q1 and Q4 of the motor driving circuit 12 are turned on in accordance with the motor control signal generated from the motor control signal generating device 192, and a voltage almost equal to the power supply voltage E1 is applied to the electrode brushes B21 and B22 of the DC motor 13. Thereby, the DC motor 13 starts rotating in the clockwise direction in step S35.

Next, the motor control circuit 19 judges if the rotation signal pulse output from the comparator 17 is detected or not in step S36. As a method of detecting the rotation signal pulse, there are several detecting methods, such as, for example, a detection of leading edge, a detection of trailing edge, a detection of both leading edge and trailing edge. In this embodiment, the leading edge of the rotation signal pulse is detected as illustrated in FIG. 17E.

If the answer is YES in step S36, the remaining rotation number calculating device 197 calculates a remaining pulse number "R" by subtracting one from the remaining pulse number C1 in step S37. Further, the motor control circuit 19 judges if the remaining pulse number "R" is zero or not in step S38. If the answer is NO in step S38, the motor rotation control operation returns to reexecute step S36. If the answer is YES in step S38, a second target cumulative pulse number "C" is set as a remaining pulse number C2 in the remaining rotation number calculating device 197 in step S39.

Almost simultaneously, the rotation speed switching device 198 switches from a target rotation speed corresponding to the initial drive power supply voltage E1 to a lower target rotation speed. Based on the switched target rotation speed, the speed-voltage converting device 199 obtains a drive voltage which enables the present rotation speed of the DC motor 13 to reach the lower target rotation speed, and applies the drive voltage setting signal to the output variable power supply circuit 11. As a result, the drive power supply voltage of the output variable power supply circuit 11 is changed (i.e., decreased) in step S40.

After decreasing the drive power supply voltage in step S40, the motor control circuit 19 judges if the rotation signal pulse output from the comparator 17 is detected or not in step S41. If the answer is YES in step S41, the remaining rotation number calculating device 197 calculates a remaining pulse number "R" by subtracting one from the remaining pulse number C2 in step S42.

Further, the motor control circuit 19 judges if the remaining pulse number "R" is zero or not in step S43. If the answer is NO in step S43, the motor control circuit 19 judges if a predetermined number of rotation signal pulses is counted after changing the drive power supply voltage in step S44. If the answer is NO in step S44, the motor rotation control operation returns to reexecute step S41. If the answer is YES in step S44, the pulse interval measuring device 193 measures the pulse interval $T_M$ based on the rotation signal pulses output from the comparator 17, and the rotation speed calculating device 194 calculates a present rotation speed V1 based on the measurement result of the pulse interval $T_M$ in step S45.

Further, the rotation speed switching device 198 compares the present rotation speed V1 calculated by the rotation speed calculating device 194 with a target rotation speed V2, and judges if the present rotation speed V1 is lower than the target rotation speed V2 in step S46.

If the answer is NO in step S46, the rotation speed switching device 198 judges if the present rotation speed V1 exceeds the target rotation speed V2 in step S47. If the answer is NO in step S47, because the present rotation speed V1 equals to the target rotation speed V2, the motor control circuit 19 continues to drive the DC motor 13 with the current drive power supply voltage in step S48. After step S48, the motor rotation control operation returns to reexecute step S41.

If the answer is YES in step S46, the speed-voltage converting device 199 outputs the drive voltage setting signal to the output variable power supply circuit 11 such that the drive power supply voltage is increased from the immediately-before drive power supply voltage in step S49.

If the answer is YES in step S47, the speed-voltage converting device 199 outputs the voltage setting signal to the output variable power supply circuit 11 such that the drive power supply voltage is decreased from the immediately-before drive power supply voltage in step S50. After both steps S49 and S50, the motor rotation control operation returns to reexecute step S41.

If the answer is NO in step S41, the motor control circuit 19 judges if a motor stop signal is generated from an external device (not shown) in step S52. If the answer is NO in step S52, the motor rotation control operation returns to reexecute step S41. If the answer is YES in step S52, the motor control signal generating device 192 outputs motor off signals to the motor driving circuit 12, and the transistors Q1 and Q4 are turned off in step S53. Then, the DC motor 13 stops rotating in step S54.

If the answer is NO in step S36, the motor control circuit 19 judges if the motor stop signal is generated from the external device (not shown) in step S51. If the answer is NO in step S51, the motor rotation control operation returns to reexecute step S36. If the answer is YES in step S51, the motor rotation control operation proceeds to step S53. Further, if the answer is YES in step S43, the motor rotation control operation proceeds to step S53.

As described above, in the DC motor rotation control apparatus according to the second embodiment of the present invention, the rotation speed of the DC motor 13 is controlled by counting the rotation number of the DC motor 13 and by changing the drive power supply voltage of the output variable power supply circuit 11. Specifically, when the cumulative rotation number of the DC motor 13 reaches a predetermined number, the target rotation speed is controlled to be switched, and the drive power supply voltage of the output variable power supply circuit 11 is changed to the one corresponding to the switched target rotation speed. In addition, when the present rotation speed V1 is lower than the target rotation speed N2, the drive power supply voltage is increased so as to increase the rotation speed of the DC motor 13. On the contrary, when the present rotation speed V1 exceeds the target rotation speed V2, the drive power supply voltage is decreased so as to decrease the rotation speed of the DC motor 13.

Owing to the above-described motor rotation control operations, the rotation of the DC motor 13 can reach a required cumulative rotation number quickly at high speed, and then the DC motor 13 can smoothly stop at a low rotation speed when the rotation of the DC motor 13 reaches the required cumulative rotation number. As a result, the stopping position accuracy of the DC motor 13 can be improved. With the above-described control of the cumulative rotation number of the DC motor 13, a position of a member that is driven by the DC motor can be adequately controlled.

In the above-described motor rotation control operations, two values of cumulative rotation number (i.e., C1 and C2) are employed. Alternatively, only one value of cumulative rotation number can be used. In such the case, when the rotation of the DC motor 13 reaches a predetermined cumulative rotation number, the rotation speed switching device 198 may switch from a target rotation speed corresponding to the initial drive power supply voltage E1 to a lower target rotation speed. And then, the drive power supply voltage of the output variable power supply circuit 11 may be decreased.

Further, in the above-described DC motor rotation control apparatus according to the second embodiment of the present invention, the rotation number of the DC motor 13 is counted from the rotation start thereof. Alternatively, the rotation number of the DC motor 13 may be counted from a predetermined time point or counted with reference to the signal generated by an external device (not shown) after the rotation start of the DC motor 13.

Next, the arrangement of the rotation detection brush for detecting the rotation of the DC motor according to the embodiments of the present invention is described in details.

FIGS. 18A through 18E illustrate an example of a DC motor wherein a rotation detecting brush BD3 is arranged in a position inclined by 60° relatively to one of electrode brushes B31 and B32, e.g., the electrode brush B32 in FIGS. 18A through 18E. Accordingly, an angle between the electrode brush B31 and the rotation detecting brush BD3 is larger than an angle between the electrode brush B32 and the rotation detecting brush BD3.

FIG. 18A illustrates an initial state of commutator CM3 of the DC motor. FIGS. 18B through 18E respectively illustrate the states of the commutator CM3 rotating clockwise in order by 30°.

Figure 19:
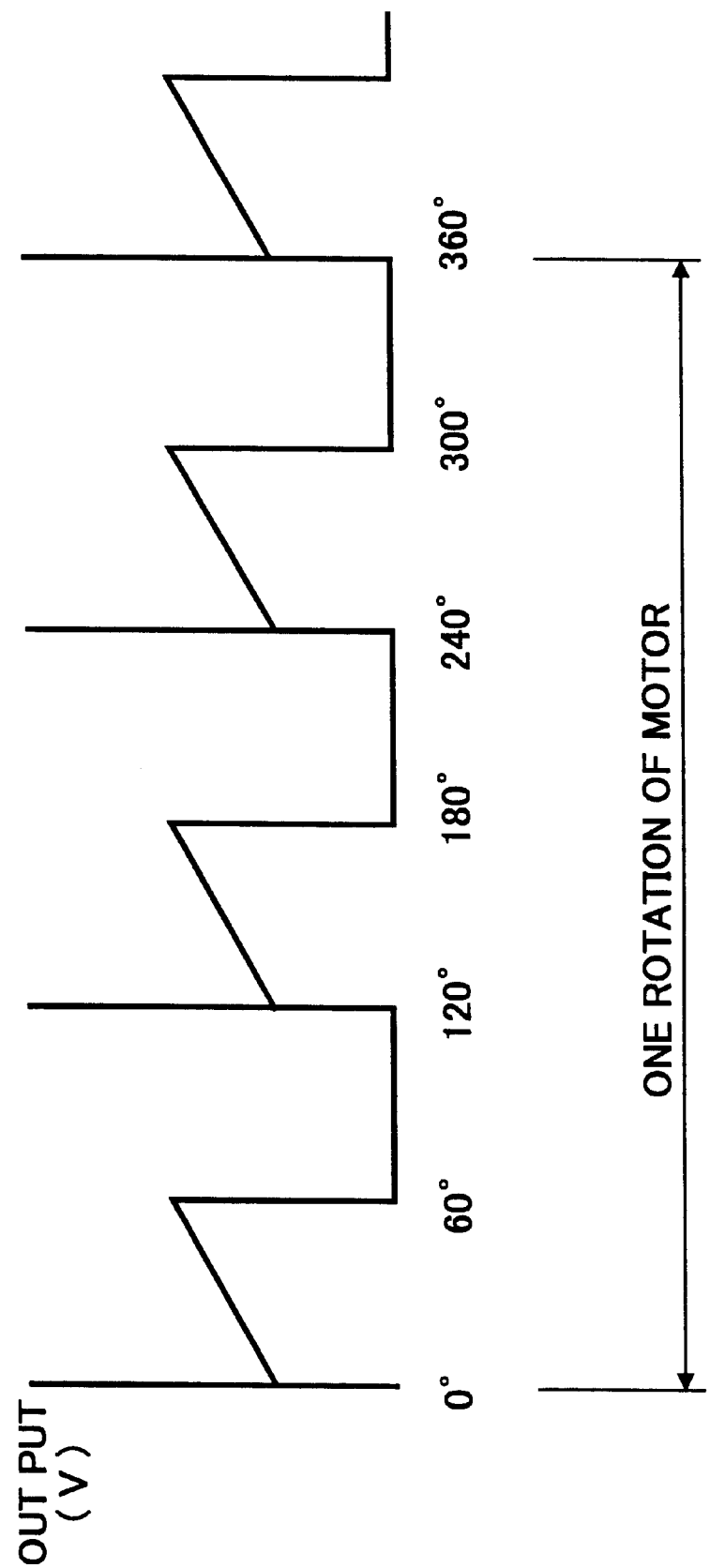
FIG. 19 is a waveform diagram of an output voltage generated from the rotation detecting brush.
Figure 24:
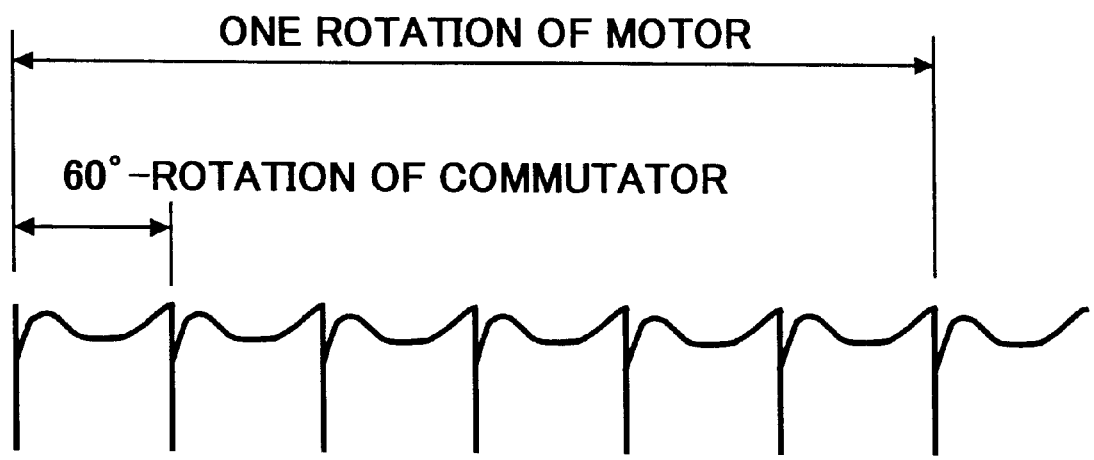
FIG. 24 is a diagram of ripple waveform according to a background art.
Figure 25:
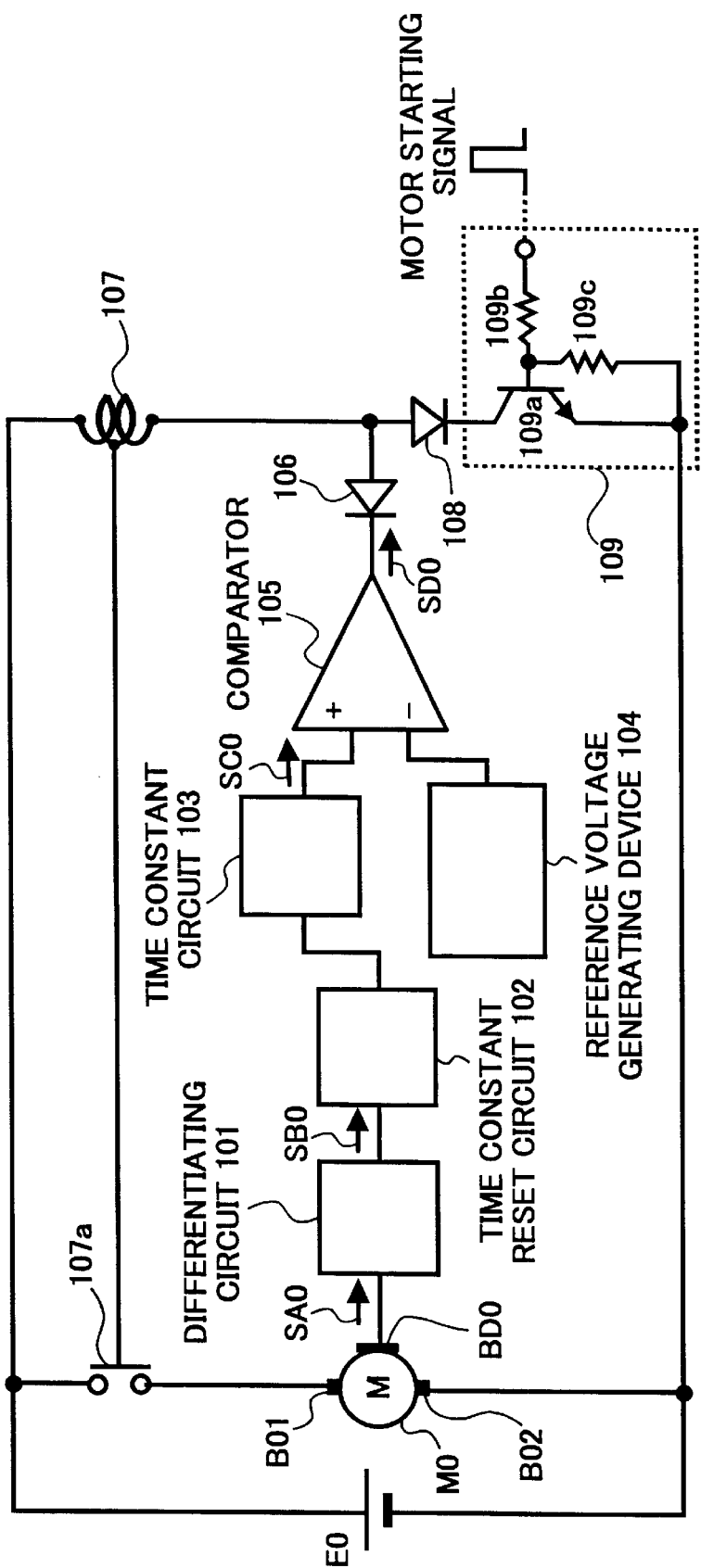
FIG. 25 is a circuit diagram illustrating a background DC motor control circuit.
Figure 26:
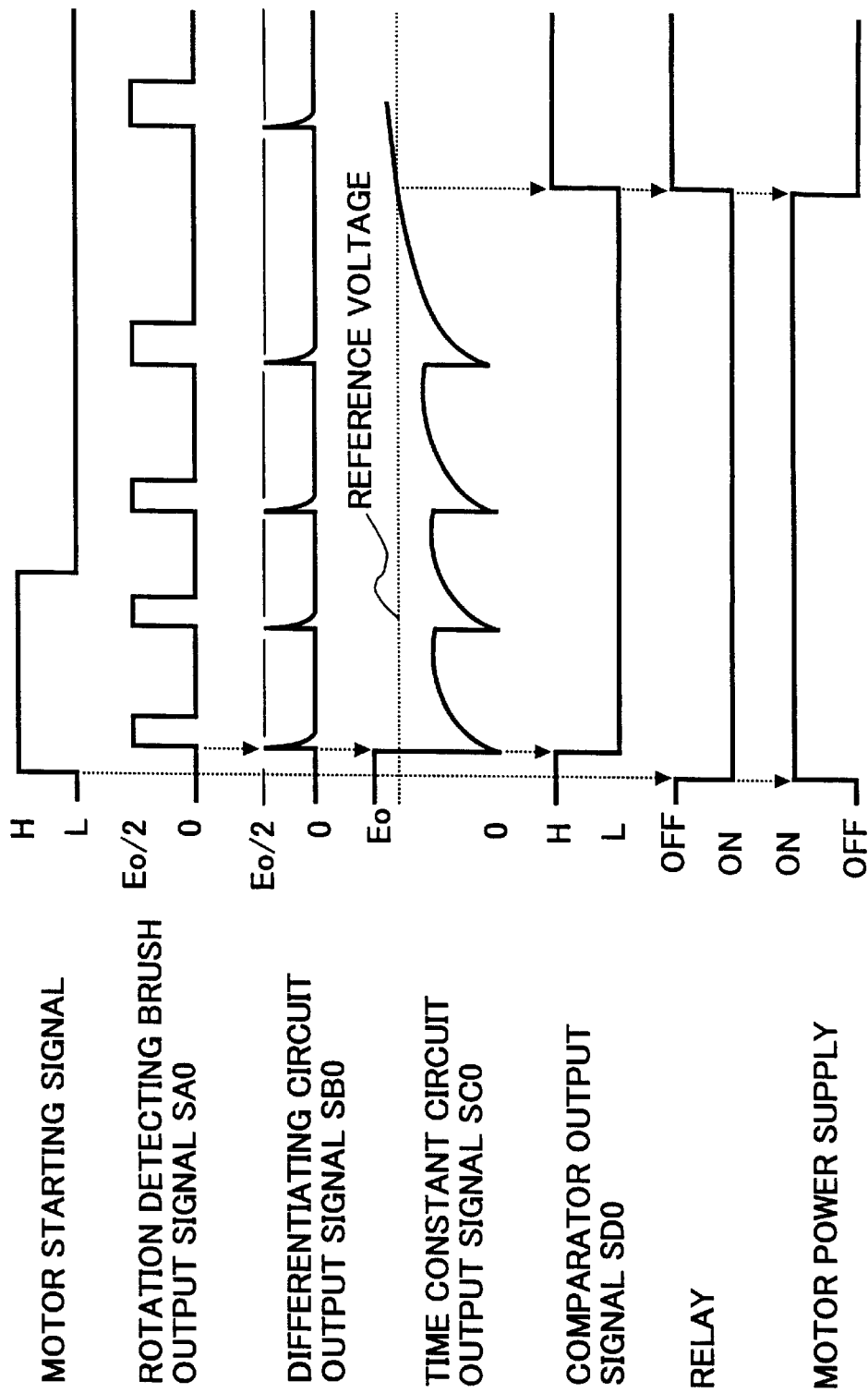
FIG. 26 is a diagram illustrating waveforms of a motor starting signal, a rotation detecting signal, an output signal from a differentiating circuit, an output signal from a time constant circuit, an output signal from a comparator, an operation (on/off) signal of a relay, and a supply signal applied to a motor from a drive power supply according to a background art.

FIG. 19 illustrates an estimated voltage waveform of an output voltage V generated from the rotation detecting brush BD3 when the commutator CM3 and the rotor are rotated as illustrated in FIGS. 18A through 18E. As is apparent from the fact in comparison with the waveform at the time of detecting rotation's number of the motor from the drive voltage ripple of the motor illustrated in FIG. 24, the waveform of the output voltage V in FIG. 19 largely varies per 60°.

Figure 20C:
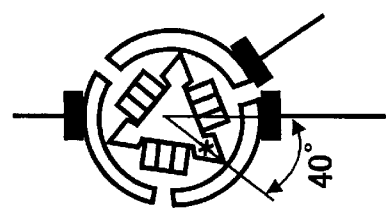
FIGS. 20A through 20G are schematic views illustrating an example of a DC motor wherein a rotation detecting brush is arranged in a position inclined by 40° relatively to the electrode brush, and conditions of the commutator rotating clockwise in order by 20°.
Figure 20B:
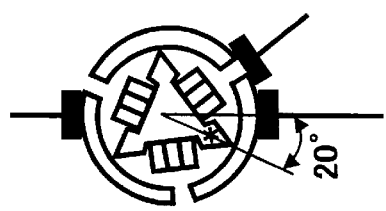
Figure 20A:
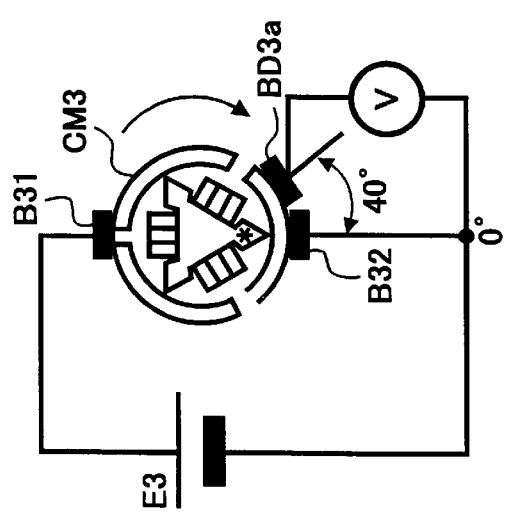
Figure 20G:
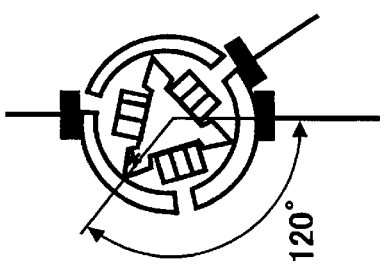
Figure 20F:
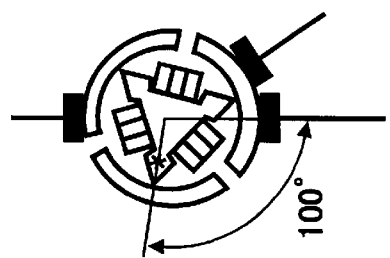
Figure 20E:
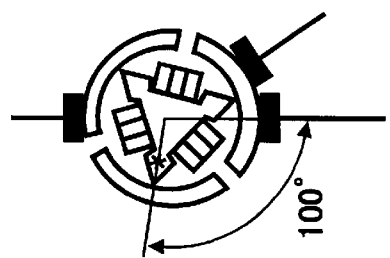
Figure 20D:
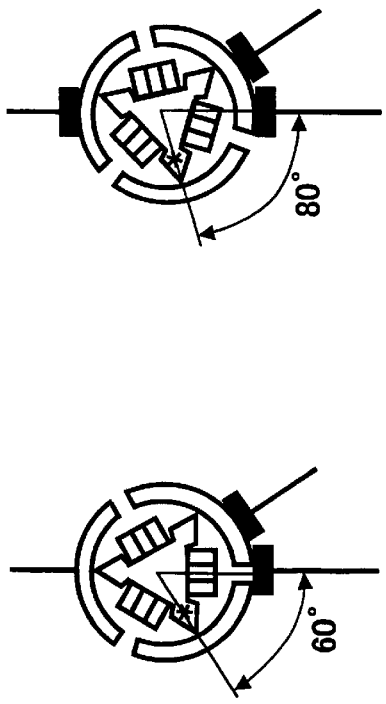

FIGS. 20A through 20G illustrate another example of the DC motor wherein a rotation detecting brush BD3*a* is arranged in a position inclined by 40° relatively to one of the electrode brushes B31 and B32, e.g., the electrode brush B32 in FIGS. 20A through 20G. FIG. 20A illustrates an initial state of the commutator CM3 of the DC motor. FIGS. 20B through 20G respectively illustrate the states of the commutator CM3 rotating clockwise in order by 20°.

Figure 21:
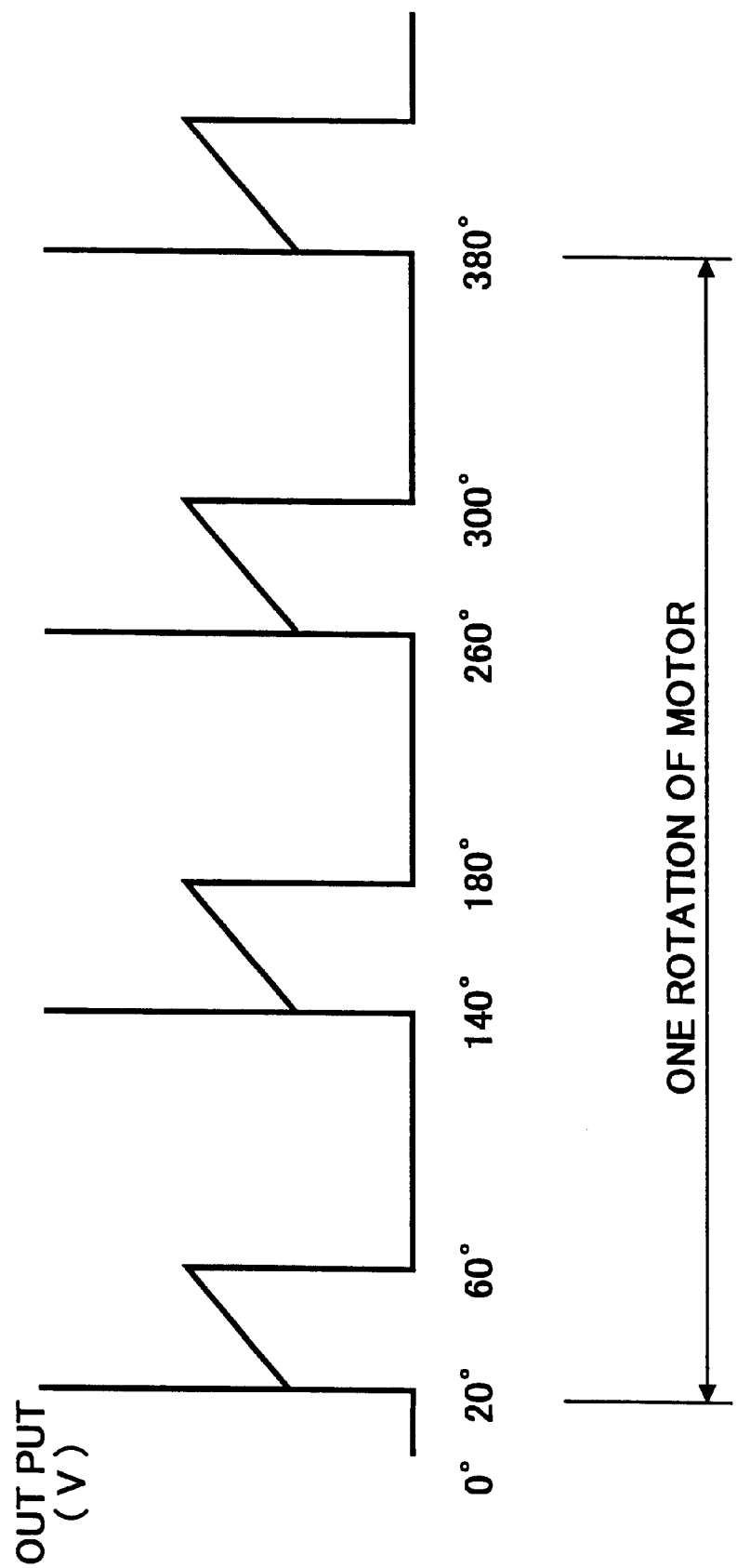
FIG. 21 is a waveform diagram of an output voltage generated from the rotation detecting brush.
Figure 22:
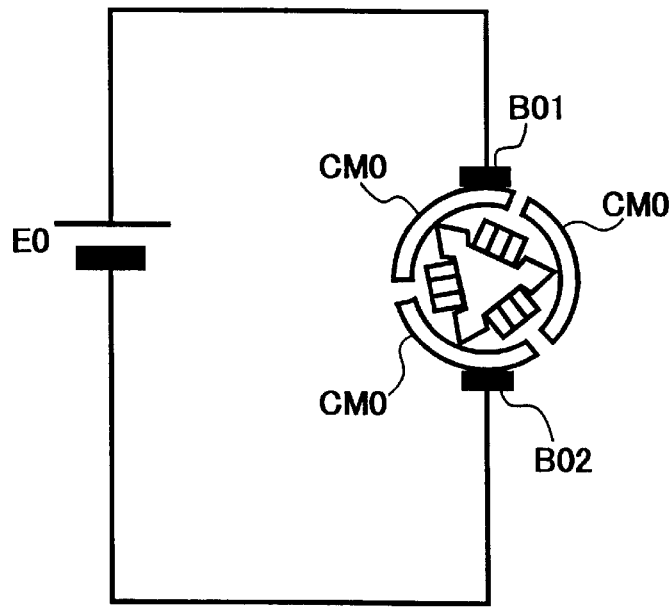
FIG. 22 is a schematic circuit diagram employing a three-pole DC motor according to a background art.
Figure 23:
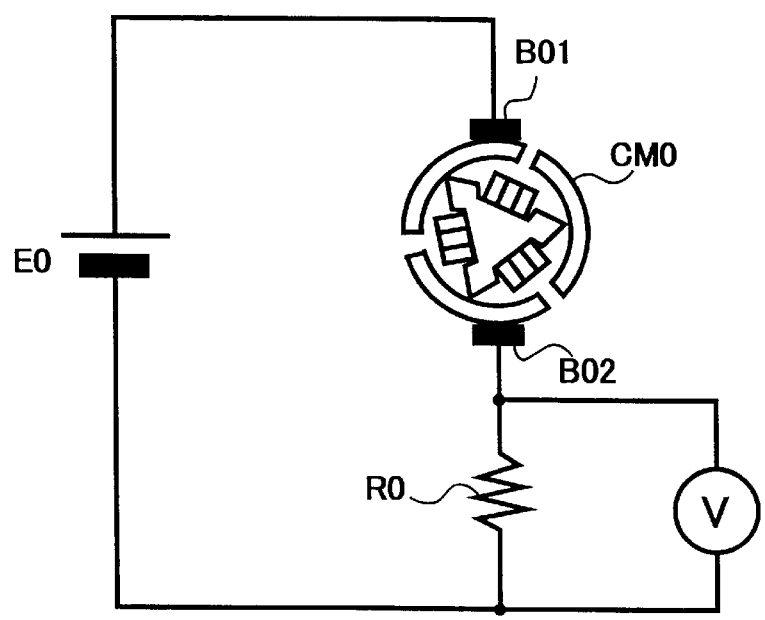
FIG. 23 is another schematic circuit diagram employing a three-pole DC motor according to a background art.

FIG. 21 illustrates an estimated voltage waveform of an output voltage V generated from the rotation detecting brush BD3*a* when the commutator CM3 and the rotor are rotated as illustrated in FIGS. 20A through 20G. If the voltage waveform is such as illustrated in FIG. 19 or FIG. 21, the information relating to the number of rotations of the DC motor can be detected from the waveform of output signal from which the high-frequency component, such as, the ripple, etc. is removed from the output voltage V by causing the output voltage V to pass through the lowpass filter.

Figure 27:
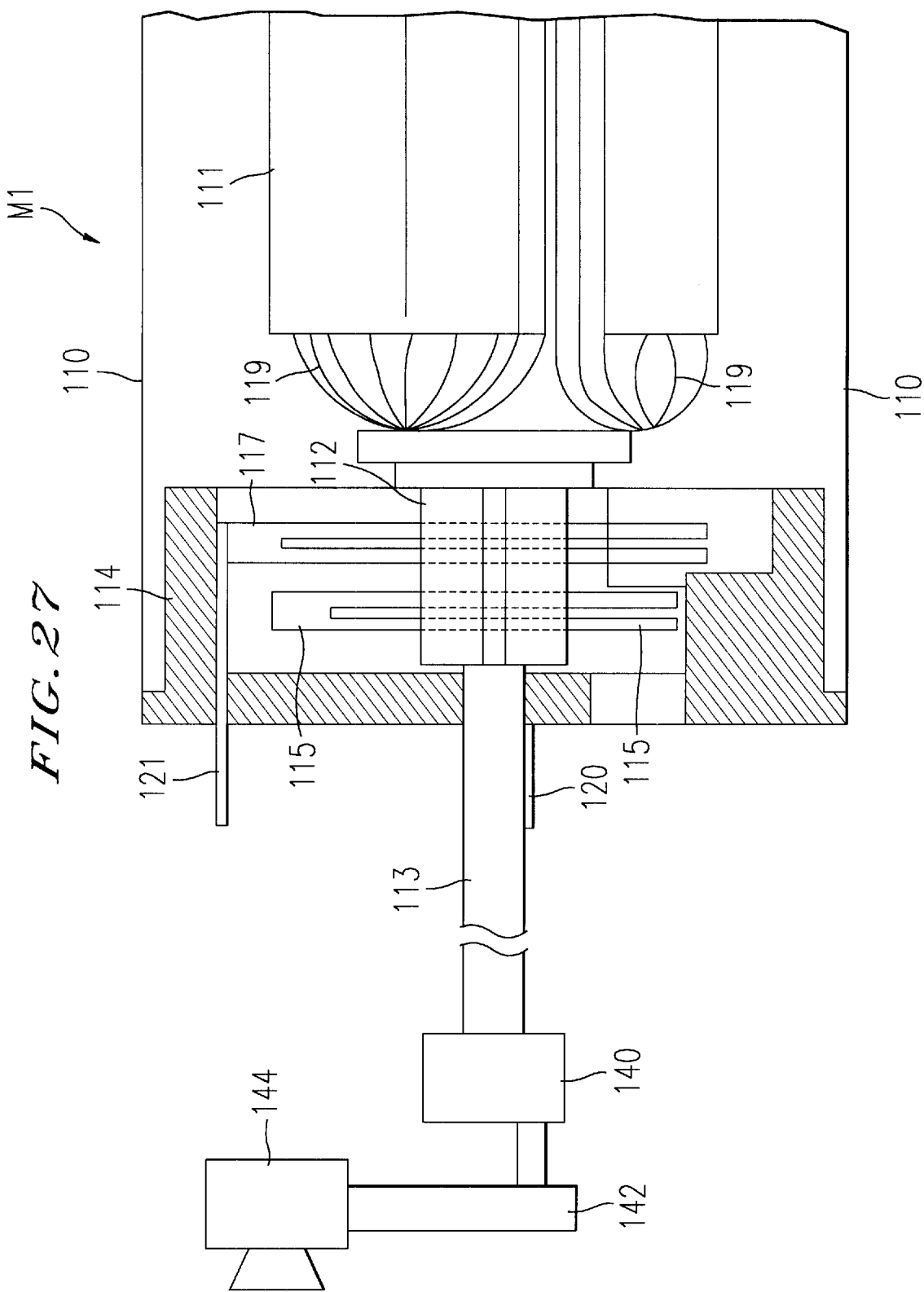
FIG. 27 is a schematic illustrating an apparatus having the direct current motor rotation control apparatus of the present invention.

FIG. 27 is a schematic illustrating an apparatus having the direct current motor rotation control apparatus of the present invention. As shown in FIG. 27, the DC motor of FIG. 1 is connected by the rotation shaft 113 to a mechanical cam 140 which in turn is connected to a mount 142 on an apparatus such as for example a zoom camera with a lens 144. The zoom speed and position of the focussing lens is precisely controlled using the direct current motor rotation control apparatus of the present invention.

What is claimed as new and desired ot be secured by Letters Patents of the United States is:

1. A direct current motor rotation control apparatus configured to control rotational operations of a direct current motor including a stator, a rotor with a rotation shaft and rotor coils, a commutator connected to the rotor coils, and a pair of electrode brushes in sliding contact with the commutator and configured to supply electric power from the commutator to the rotor coils to change a state of a direct current drive voltage to the rotor coils, comprising:

at least one rotation detecting brush contacting the commutator at a different axial position from an axial position contacted by the pair of electrode brushes and configured to detect a signal on the commutator indicative of an operation of the direct current motor;

a motor driving circuit configured to drive the direct current motor by applying the direct current drive voltage to the pair of electrode brushes;

a reference voltage generating device configured to generate a reference voltage in proportion to the direct current drive voltage;

a comparator configured to compare the signal detected by the at least one rotation detecting brush with the reference voltage generated by the reference voltage generating device and to produce a pulse train of pulse period corresponding to a rotational speed of the direct current motor as an output comparison signal; and a motor control circuit configured to adjust the direct current drive voltage based on said output comparison signal, thereby to control an operation of the direct current motor.

2. The apparatus according to claim 1, wherein the motor control circuit comprises:

a pulse interval measuring device configured to measure a pulse interval of the output comparison signal; and a rotation speed calculating device configured to calculate an instantaneous rotation speed of the direct current motor based on the pulse interval measured by the pulse interval measuring device.

3. The apparatus according to claim 2, wherein the motor control circuit further comprises:

a rotation speed comparing device configured to compare the instantaneous rotation speed of the direct current motor calculated by the rotation speed calculating device to a target rotation speed of the direct current motor and to produce a comparison result.

4. The apparatus according to claim 3, wherein the motor control circuit further comprises:

a speed converting device configured to calculate, based on the comparison result, a value of the direct current drive voltage to be applied to the pair of electrode brushes so as to obtain the target rotation speed; and a drive voltage control device configured to apply a direct current drive voltage to the pair of electrode brushes corresponding to the value of the direct current drive voltage calculated from the speed converting device.

5. The apparatus according to claim 1, wherein the reference voltage generating device is configured to generate a reference voltage corresponding to a direct current drive voltage for one rotational direction of the rotor.

6. The apparatus according to claim 1, wherein the reference voltage generating device is configured to generate plural reference voltages corresponding to respective different rotational directions of the rotor.

7. The apparatus according to claim 1, wherein the reference voltage generating device is configured to generate plural reference voltages corresponding to plural direct current drive voltages applied to the pair of electrode brushes.

8. The apparatus according to claim 1, further comprising:

a noise removing circuit configured to remove high frequency noise components from the detected signal on the commutator.

9. The apparatus according to claim 1, wherein the motor control circuit comprises:
   a pulse number counting device configured to count a pulse number of said output comparison signal;
   a cumulative rotation number calculating device configured to calculate a cumulative rotation number of the rotor based on the pulse number counted by the pulse number counting device;
   a remaining rotation number calculating device configured to calculate a remaining rotation number based on the cumulative rotation number subtracted from a target cumulative rotation number;
   a pulse interval measuring device configured to measure a pulse interval of the output comparison signal; and
   a rotation speed calculating device configured to calculate an instantaneous rotation speed of the rotor based on the pulse interval measured by the pulse interval measuring device.

10. The apparatus according to claim 9, wherein the motor control circuit further comprises:
   a rotation speed switching device configured to switch a first target rotation speed of the rotor to a second target rotation speed corresponding to the remaining rotation number when the remaining rotation number reaches at least one predetermined remaining rotation number;
   a speed converting device configured to calculate a value of the direct current drive voltage to be applied to the pair of electrode brushes based on the instantaneous rotation speed and the second target rotation speed; and
   a drive voltage control device configured to control the drive voltage to the rotor coils by applying a direct current drive voltage corresponding to the value of voltage calculated by the speed converting device to the motor driving circuit so as to obtain the second target rotation speed of the direct current motor.

11. The apparatus according to claim 9, wherein said direct current motor rotation control apparatus further comprises:
   a noise removing circuit configured to remove high frequency noise components from the detected voltage on the commutator.

12. A method for controlling a rotational speed of a direct current motor including a stator, a rotor including a rotation shaft and rotor coils, a commutator connected to the rotor coils, a pair of electrode brushes in sliding contact with the commutator and configured to supply electric power from the commutator to the rotor coils to change a state of a direct current drive voltage to the rotor coils and at least one rotation detecting brush contacting the commutator at a different axial position from an axial position contacted by the pair of electrode brushes and configured to detect a voltage on the commutator indicative of an operation of the direct current motor, comprising the steps of:
   applying as the direct current drive voltage an initial drive voltage to the pair of electrode brushes to start a rotation of the direct current motor;
   outputting a reference signal in proportion to the direct current drive voltage;
   receiving rotation signal pulses from the at least one rotation detection brush;
   comparing received rotation signal pulses to the reference signal and outputting a pulse train of pulse period corresponding to a rotational speed of the direct current motor as a comparison signal;
   calculating an instantaneous rotation speed based on said comparison signal;
   comparing the instantaneous rotation speed to a first target rotation speed; and
   adjusting the direct current drive voltage in accordance with said comparison to the instantaneous rotation speed.

13. The method according to claim 12, wherein the step of adjusting comprises:
   increasing said drive voltage when said instantaneous rotation speed is lower than said first target rotation speed.

14. The method according to claim 12, wherein the step of adjusting comprises:
   decreasing said drive voltage when said instantaneous rotation speed is greater than said first target rotation speed.

15. The method according to claim 12, wherein the step of calculating an instantaneous rotation speed comprises:
   determining the instantaneous rotation speed based on a pulse duration of the comparison signal.

16. The method according to claim 12, further comprising:
   reducing the drive voltage to the pair of electrode brushes to correspond to a second target rotation speed when the instantaneous speed reaches the first target rotation speed.

17. The method according to claim 12, further comprising:
   reducing the drive voltage to the pair of electrode brushes to correspond to a second target rotation speed when a cumulative rotation number reaches a predetermined rotation number.

18. A device for controlling a rotational speed of a direct current motor including a stator, a rotor including a rotation shaft and rotor coils, a commutator connected to the rotor coils, a pair of electrode bushes in sliding contact with the commutator and configured to supply electric power from the commutator to the rotor coils to change a state of a direct current drive voltage to the rotor coils and at least one rotation detecting brush contacting the commutator at a different axial position from an axial position contacted by the pair of electrode brushes and configured to detect a voltage on the commutator indicative of an operation of the direct current motor, comprising:
   means for applying an initial drive voltage as the direct current drive voltage as the direct current drive voltage to the pair of electrode brushes to start a rotation of the direct current motor;
   means for outputting a reference signal in proportion to the direct current drive voltage;
   means for receiving rotation signal pulses from the at least one rotation detection brush;
   means for comparing received rotation signal pulses to the reference signal and outputting a pulse train of pulse period corresponding to a rotational speed of the direct current motor as a comparison signal;
   means for calculating an instantaneous rotation speed based on said comparison signal;
   means for comparing the instantaneous rotation speed to a first target rotation speed; and
   means for adjusting the direct current drive voltage in accordance with said comparison to the instantaneous rotation speed.

19. The device according to claim 18, wherein the means for adjusting comprises:
   means for increasing said drive voltage when said instantaneous rotation speed is lower than said first target rotation speed.

20. The device according to claim 18, wherein the means for adjusting comprises:
   means for decreasing said drive voltage when said instantaneous rotation speed is greater than said first target rotation speed.

21. The device according to claim 18, wherein the means for calculating an instantaneous rotation speed comprises:
   means for determining the instantaneous rotation speed based on a pulse duration of the comparison signal.

22. The device according to claim 18, further comprising:
   means for reducing the drive voltage to the pair of electrode brushes to correspond to a second target rotation speed when the instantaneous speed reaches the first target rotation speed.

23. The device according to claim 18, further comprising:
   means for reducing the drive voltage to the pair of electrode brushes to correspond to a second target rotation speed when a cumulative rotation number reaches a predetermined rotation number.

24. An apparatus having a direct current motor rotation control apparatus configured to control rotational operations of a direct current motor including a stator, a rotor with a rotation shaft and rotor coils, a commutator connected to the rotor coils, and a pair of electrode brushes in sliding contact with the commutator and configured to supply electric power from the commutator to the rotor coils to change a state of a direct current drive voltage to the rotor coils, said direct current motor rotation control apparatus comprising:
   at least one rotation detecting brush contacting the commutator at a different axial position from an axial position contacted by the pair of electrode brushes and configured to detect a signal on the commutator indicative of an operation of the direct current motor;
   a motor driving circuit configured to drive the direct current motor by applying the direct current drive voltage to the pair of electrode brushes;
   a reference voltage generating device configured to generate a reference voltage in proportion to the direct current drive voltage;
   a comparator configured to compare the signal detected by the at least one rotation detecting brush with the reference voltage generated by the reference voltage generating device and to produce a pulse train of pulse period corresponding to a rotational speed of the direct current motor as an output comparison signal; and
   a motor control circuit configured to adjust the direct current drive voltage based on said output comparison signal, thereby to control an operation of the direct current motor.

25. The apparatus according to claim 24, wherein the motor control circuit comprises:
   a pulse interval measuring device configured to measure a pulse interval of the output comparison signal; and
   a rotation speed calculating device configured to calculate an instantaneous rotation speed of the direct current motor based on the pulse interval measured by the pulse interval measuring device.

26. The apparatus according to claim 25, wherein the motor control circuit further comprises:
   a rotation speed comparing device configured to compare the instantaneous rotation speed of the direct current motor calculated by the rotation speed calculating device to a target rotation speed of the direct current motor and to produce a comparison result.

27. The apparatus according to claim 26, wherein the motor control circuit further comprises:
   a speed converting device configured to calculate based on the comparison result a value of the direct current drive voltage to be applied to the pair of electrode brushes so as to obtain the target rotation speed; and
   a drive voltage control device configured to apply a direct current drive voltage to the pair of electrode brushes corresponding to the value of the direct current drive voltage calculated from the speed converting device.

28. The apparatus according to claim 24, wherein the reference voltage generating device is configured to generate a reference voltage corresponding to a direct current drive voltage for one rotational direction of the rotor.

29. The apparatus according to claim 24, wherein the reference voltage generating device is configured to generate plural reference voltages corresponding to respective different rotational directions of the rotor.

30. The apparatus according to claim 24, wherein the reference voltage generating device is configured to generate plural reference voltages corresponding to plural direct current drive voltages applied to the pair of electrode brushes.

31. The apparatus according to claim 24, wherein the direct current motor rotation control apparatus further comprises:
   a noise removing circuit configured to remove high frequency noise components from the detected signal on the commutator.

32. The apparatus according to claim 24, wherein the motor control circuit comprises:
   a pulse number counting device configured to count a pulse number of said output comparison signal;
   a cumulative rotation number calculating device configured to calculate a cumulative rotation number of the rotor based on the pulse number counted by the pulse number counting device;
   a remaining rotation number calculating device configured to calculate a remaining rotation number based on the cumulative rotation number subtracted from a target cumulative rotation number;
   a pulse interval measuring device configured to measure a pulse interval of the output comparison signal; and
   a rotation speed calculating device configured to calculate an instantaneous rotation speed of the rotor based on the pulse interval measured by the pulse interval measuring device.

33. The apparatus according to claim 32, wherein the motor control circuit further comprises:
   a rotation speed switching device configured to switch a first target rotation speed of the rotor to a second target rotation speed corresponding to the remaining rotation number when the remaining rotation number reaches at least one predetermined remaining rotation number;
   a speed converting device configured to calculate a value of the direct current drive voltage to be applied to the pair of electrode brushes based on the instantaneous rotation speed and the second target rotation speed; and
   a drive voltage control device configured to control the drive voltage to the rotor coils by applying a direct current drive voltage corresponding to the value of voltage calculated by the speed converting device to the motor driving circuit so as to obtain the second target rotation speed of the direct current motor.

34. The apparatus according to claim 32, wherein said direct current motor rotation control apparatus further comprises:
   a noise removing circuit configured to remove high frequency noise components from the detected voltage on the commutator.

* * * * *